(12) United States Patent
Max et al.

(10) Patent No.: US 10,412,934 B2
(45) Date of Patent: Sep. 17, 2019

(54) RETRACTABLE LEASH ASSEMBLY

(71) Applicant: Thundershirt, LLC, Durham, NC (US)

(72) Inventors: Nicholas B. Max, Warrington, PA (US); Gary E. Reuther, Warminster, PA (US)

(73) Assignee: Thundershirt, LLC, Durham, NC (US)

( * ) Notice: Subject to any disclaimer, the term of this patent is extended or adjusted under 35 U.S.C. 154(b) by 191 days.

(21) Appl. No.: 15/360,228

(22) Filed: Nov. 23, 2016

(65) Prior Publication Data

US 2017/0142935 A1   May 25, 2017

Related U.S. Application Data

(60) Provisional application No. 62/259,878, filed on Nov. 25, 2015.

(51) Int. Cl.
*A01K 27/00* (2006.01)
(52) U.S. Cl.
CPC .................................. *A01K 27/004* (2013.01)
(58) Field of Classification Search
CPC ..................................................... A01K 27/004
USPC ..... 119/794–97; 242/385, 385.3, 396, 396.1, 242/396.2, 396.3, 396.4, 543.2, 389, 242/397.3
See application file for complete search history.

(56) References Cited

U.S. PATENT DOCUMENTS

| | | | |
|---|---|---|---|
| 2,919,676 A | 1/1960 | Schneider | |
| 3,782,215 A | 1/1974 | Moody | |
| 4,726,539 A * | 2/1988 | Schmidt | B60R 22/415 242/382.2 |
| 5,257,754 A | 11/1993 | Hishon | |
| 6,523,500 B1 * | 2/2003 | Zenteno | A01K 1/04 119/786 |
| 7,896,281 B2 | 3/2011 | Bleshoy | |

(Continued)

FOREIGN PATENT DOCUMENTS

| | | | |
|---|---|---|---|
| DE | 102017109355 B3 * | 7/2018 | ......... B65H 75/4418 |
| GB | 2481403 A | 12/2011 | |

OTHER PUBLICATIONS

Thundershirt, LLC, International Patent Application No. PCT/US2016/063543, International Search Report and Written Opinion, dated Feb. 17, 2017.

(Continued)

*Primary Examiner* — Lisa L Tsang
(74) *Attorney, Agent, or Firm* — Taylor English Duma LLP

(57) ABSTRACT

An apparatus for automatically retracting a leash comprises a spool rotatably mounted in a housing. The spool includes a hub and gear teeth disposed about an outer surface of the hub. A gear train is operatively engaged with the gear teeth on the hub of the spool. A carrier linkage houses a portion of the gear train for rotation of the carrier linkage upon rotation of the gears in the gear train. A lockout pawl in the housing is movable between a first position that enables the spool to freely rotate and a second locked position to lock the spool against rotation. A cam surface on the rotating carrier linkage is configured to engage the pawl for moving the pawl to the second position. A control knob enables the gear train to be selectively positioned with the respect to the pawl to selectively predetermine the maximum length of the leash.

10 Claims, 31 Drawing Sheets

(56) References Cited

U.S. PATENT DOCUMENTS

| | | | |
|---|---|---|---|
| 8,695,537 B2* | 4/2014 | Bizzell | A01K 27/004 119/794 |
| 2004/0237906 A1 | 12/2004 | Waxman et al. | |
| 2007/0131177 A1 | 6/2007 | Perkitny | |
| 2008/0011895 A1 | 1/2008 | Bleshoy | |
| 2011/0073047 A1* | 3/2011 | Simpson | A01K 1/04 119/796 |
| 2011/0220036 A1* | 9/2011 | Matthews | A01K 27/004 119/796 |
| 2013/0008392 A1 | 1/2013 | Holmstrom | |
| 2016/0120152 A1* | 5/2016 | Zhu | A01K 27/004 119/796 |
| 2016/0338323 A1* | 11/2016 | Nishida | A01K 27/004 |

OTHER PUBLICATIONS

WIPO; International Preliminary Report on Patentability for International Application No. PCT/US16/63543 dated Jun. 7, 2018, 7 pages.

* cited by examiner

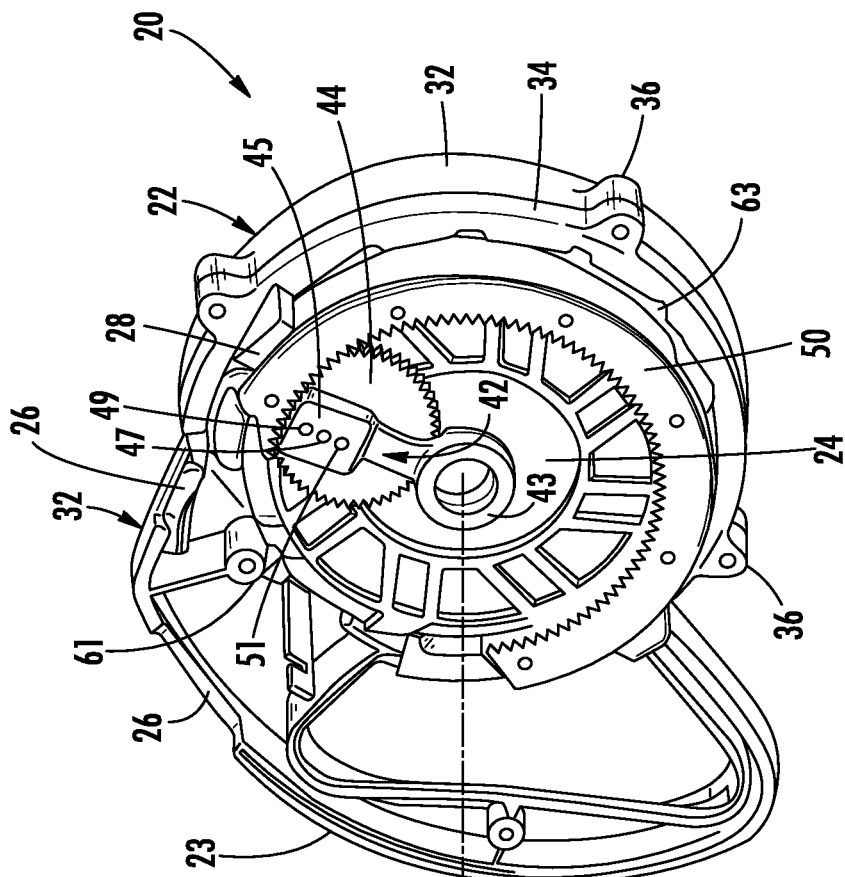
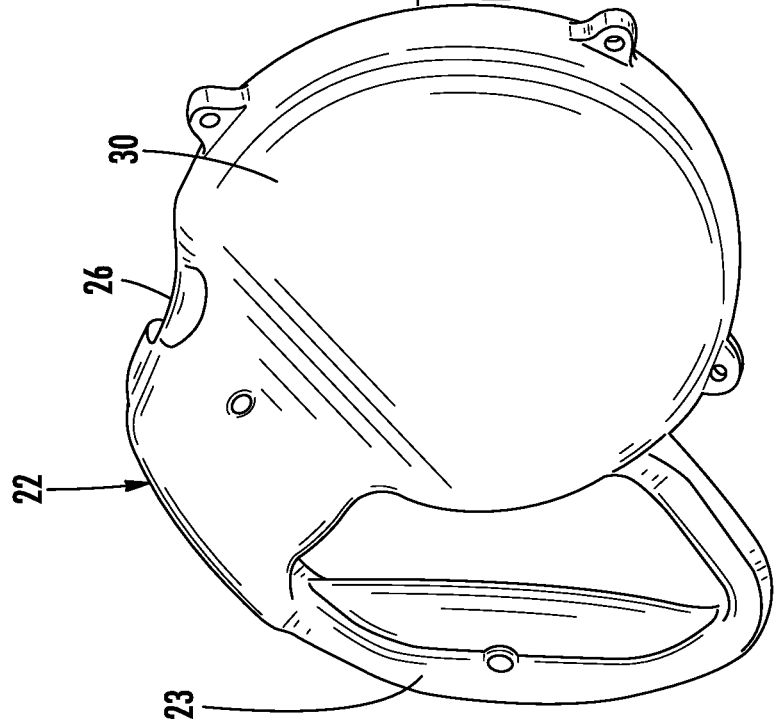
FIG. 3

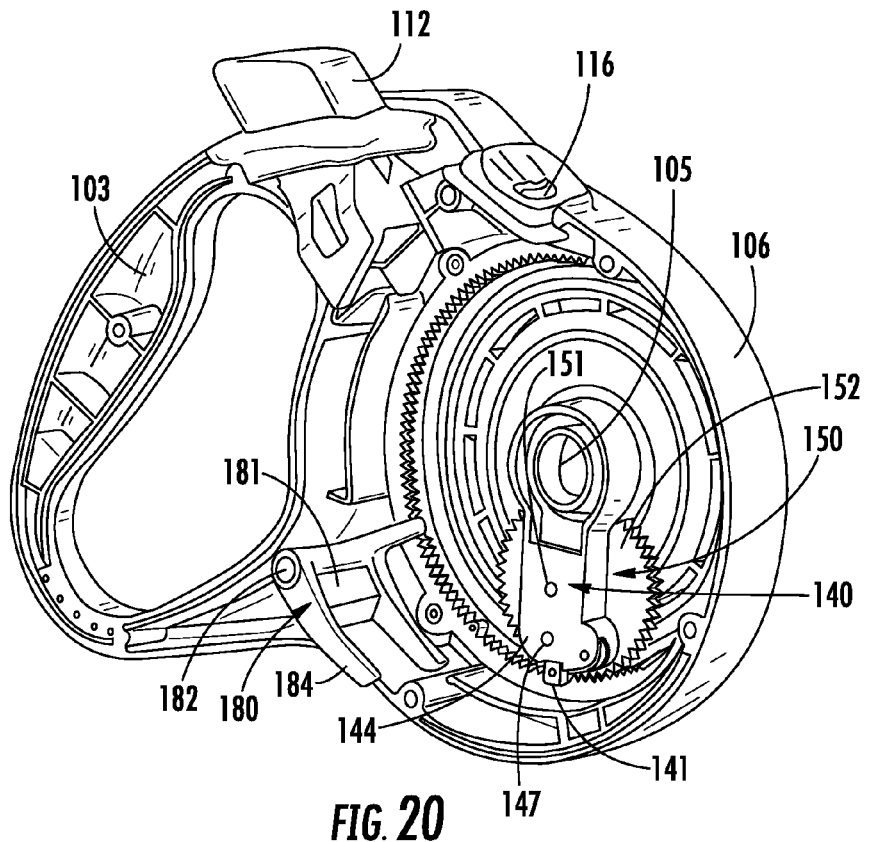
FIG. 20
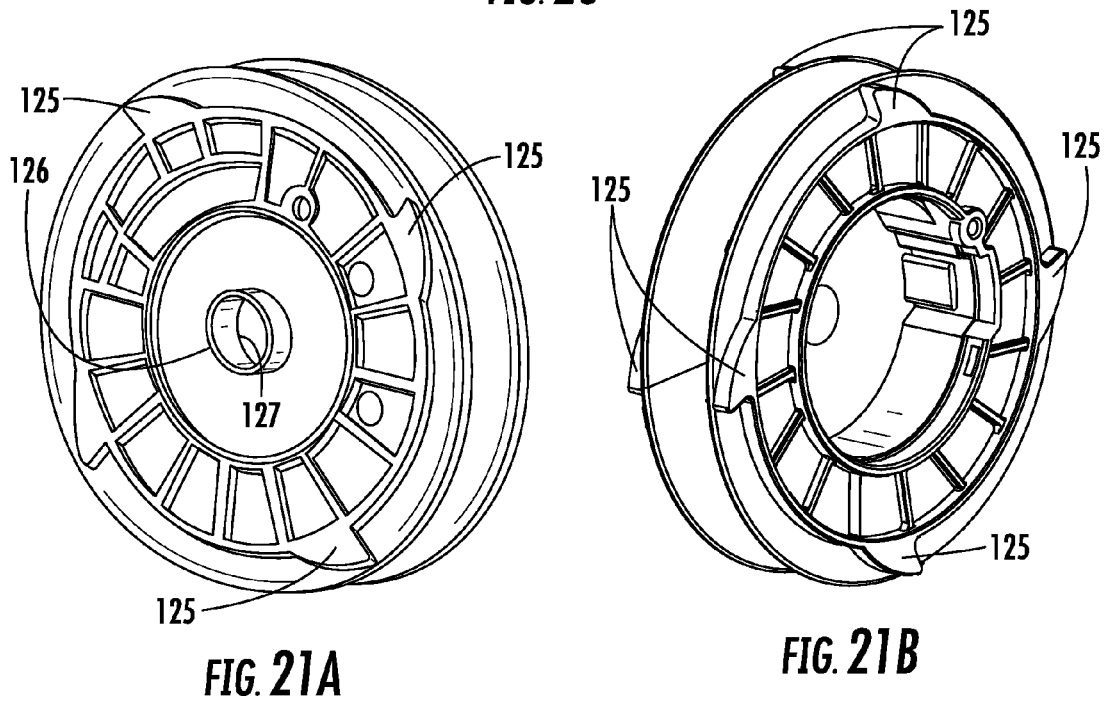
FIG. 21A
FIG. 21B

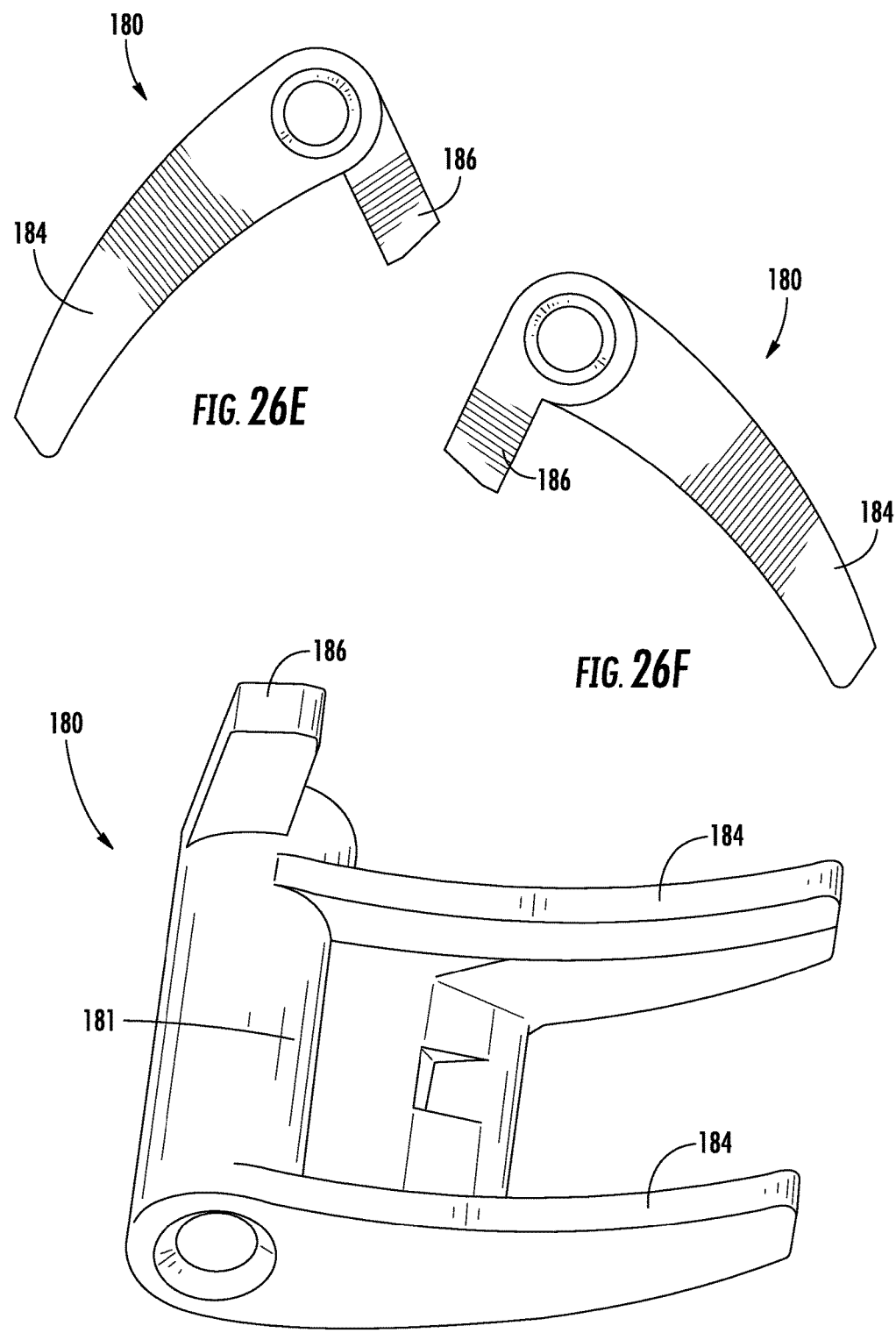

RETRACTABLE LEASH ASSEMBLY

CROSS-REFERENCE

This application is related to U.S. provisional application No. 62/259,878, filed Nov. 25, 2015, entitled "RETRACTABLE LEASH ASSEMBLY", naming Nicholas B. Max and Gary E. Reuther as the inventors. The contents of the provisional application are incorporated herein by reference in their entirety, and the benefit of the filing date of the provisional application is hereby claimed for all purposes that are legally served by such claim for the benefit of the filing date.

BACKGROUND

A leash assembly is described for use as an animal leash that can be wound up and unwound and, more particularly, a leash assembly is described that functions as a retractable animal leash.

A conventional retractable leash includes a housing with a handle and a leash wound on a spool rotatably mounted in the housing. A connector at the outer distal end of the leash is connectable to a collar on an animal, such as a dog. The spool contains a coiled spring mechanism that maintains tension on the leash while it is pulled from the spool to any length from fully retracted to fully extended. The spring mechanism automatically retracts (or rewinds) the leash as the distance between dog and human reduces. The leash does not become slack, drag on the ground, get tangled, or experience other issues typical with a standard fixed-length leash.

A retractable leash has a single defined maximum length dictated by the length of the leash on the reel. When the leash is fully unwound from the spool, the "maximum length" has been reached. The typical retractable leash has a manually operated braking mechanism that, when depressed, will stop the leash from further extending or retracting at a selected length. The length of leash can thus be restricted to less than the maximum length by actuating the braking mechanism. In some applications, the manual brake also has a locking mechanism that will hold the brake in the depressed position such that the desired length of the leash remains in the extended state. While the brake is applied, the leash acts as a fixed-length leash, that is, it becomes slack and dangles unless stretched to its full fixed length.

One of the biggest concerns about using a standard retractable leash is safety. The maximum length is typically between 12 and 18 feet. When walking a dog, the human must remain diligent for any hazards that might come within the range of the maximum length. For example, if walking on a city sidewalk, a dog might run into the street in front of a car or lunge at an approaching dog. If the human does not react and manually brake the leash in time, serious injury or worse could result.

For the foregoing reasons, there is a need for a retractable leash that may selectively be restricted to a predetermined length less than the maximum length before and while walking the dog.

SUMMARY

An apparatus is provided for automatically retracting a leash for an animal. The leash retracting apparatus comprises a housing defining an opening for passing the leash. A spool is rotatably mounted in the housing for selectively winding and unwinding of the leash. The spool includes a hub defining an axis of rotation, and gear teeth disposed about an outer surface of the hub. A gear train, including a plurality of gears, is operatively engaged with the gear teeth on the hub of the spool for rotation of the gears in the gear train. A carrier linkage is rotatable about the rotation axis of the spool. The carrier linkage defines a cavity for housing a portion of the gear train for rotation of the carrier linkage about the rotation axis upon rotation of the gears in the gear train. A distal end of the carrier linkage includes a radially outwardly extending cam surface. A lockout pawl is pivotably secured in the housing and movable between a first position that enables the spool to freely rotate and a second locked position to lock the spool against rotation. The cam surface on the rotating carrier linkage is configured to engage the pawl for moving the pawl to the second position. A control knob rotatable about the rotation axis enables the gear train to be selectively positioned with the respect to the pawl. The control knob thus functions to selectively predetermine the maximum length of the leash extending from the housing before the cam surface on the carrier linkage engages the pawl as the leash is being unwound from the spool.

In one aspect, the leash retracting apparatus comprises a knob link disposed in the housing and has a proximal end operatively connected to the control knob for being rotatable about the rotation axis. A distal end of the knob link pivotably connects to the lockout pawl. The lockout pawl is selectively positioned with respect to the carrier linkage by rotation of the control knob.

In a related aspect, an inner surface of the housing adjacent the periphery of the spool includes teeth engaged by the pawl in the second position of the pawl for preventing rotation of the spool.

In a further aspect, the control knob is connected for rotation with the carrier linkage about the rotation axis. The carrier linkage and the gear train are thus selectively positioned with respect to the pawl by rotation of the control knob.

In a related aspect, the control knob and the carrier linkage are movable relative to the housing along the rotation axis for disconnecting the gear train and allowing rotation of the control knob and the carrier linkage relative to the pawl.

BRIEF DESCRIPTION OF THE DRAWINGS

For a more complete understanding of the retractable leash assembly, reference should now be had to the embodiments shown in the accompanying drawings and described below. In the drawings:

FIG. 3 is a right side perspective view of the retractable leash assembly as shown in FIG. 1 with the right side of a housing exploded.

FIG. 20 is a right side perspective view of the retractable leash assembly as shown in FIG. 17 with the spool removed for clarity.

FIG. 21A is a right side perspective view of an embodiment of a spool for use with the retractable leash assembly as shown in FIG. 17.

FIG. 21B is a left side perspective view of the spool as shown in FIG. 21A.

FIGS. 26A-26G is a lockout pawl for use with the retractable leash assembly as shown in FIG. 17.

DESCRIPTION

Certain terminology is used herein for convenience only and is not to be taken as a limiting. For example, words such as "upper," "lower," "left," "right," "horizontal," "vertical," "upward," "downward," "top" and "bottom" merely describe the configurations shown in the FIGS. Indeed, the components may be oriented in any direction and the terminology, therefore, should be understood as encompassing such variations unless specified otherwise. The words "interior" and "exterior" refer to directions toward and away from, respectively, the geometric center of the core and designated parts thereof. The terminology includes the words specifically mentioned above, derivatives thereof and words of similar import.

Figure 1:
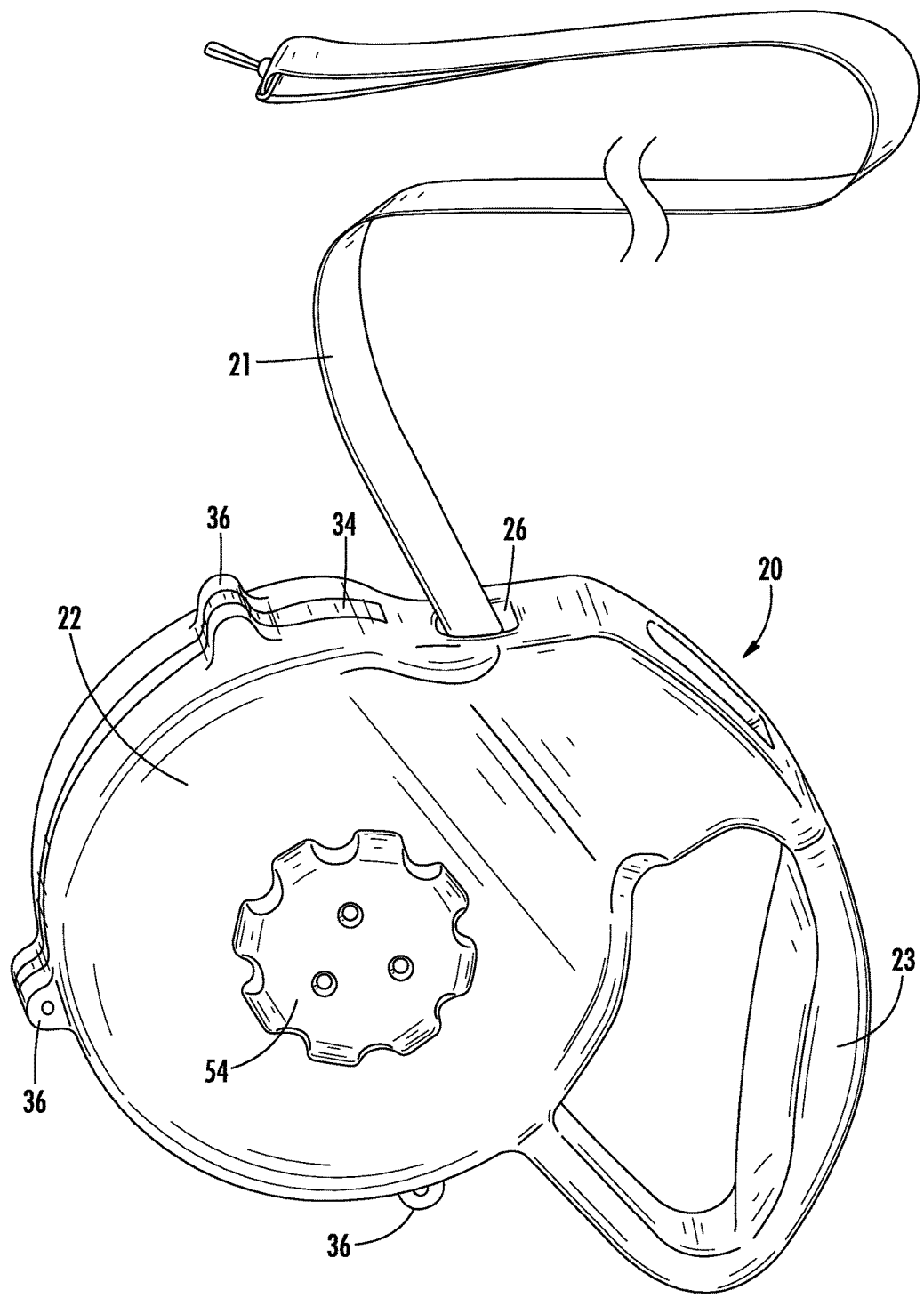
FIG. 1 is a left side perspective view of an embodiment of an apparatus for use as a retractable leash assembly.
Figure 2:
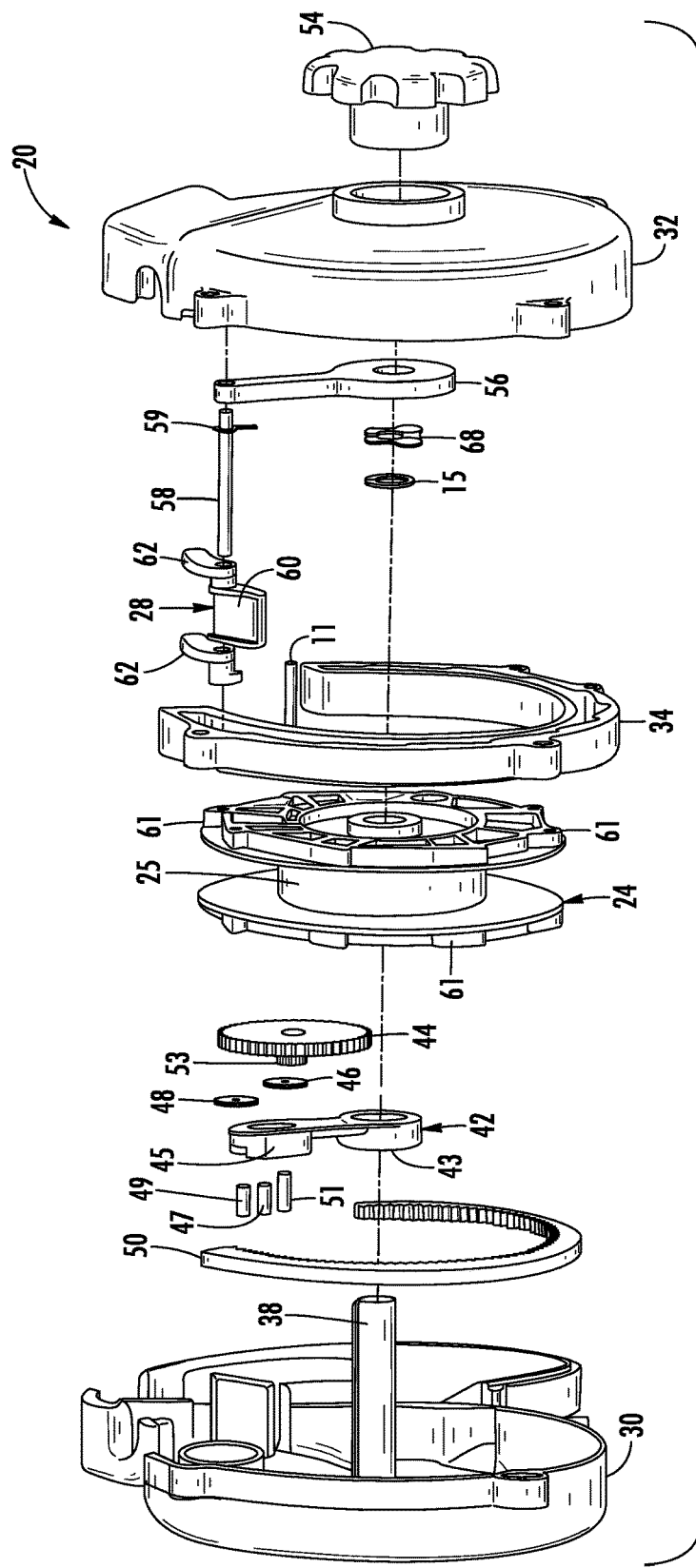
FIG. 2 is an exploded front elevation view of the retractable leash assembly as shown in FIG. 1.

An embodiment of a retractable leash assembly is shown in FIGS. 1 and 2 and generally designated at 20. The leash assembly 20 comprises a conventional leash 21 and a housing 22 including a rearwardly extending handle 23. The leash extends from a slot 26 in the housing 22. The leash assembly 20 may also include conventional leash braking means (not shown) that functions to manually stop extension and retraction of the leash 12 relative to the hosing 22. The leash braking means makes it possible for the user to lock the leash at any desired extended length.

Figure 4A:
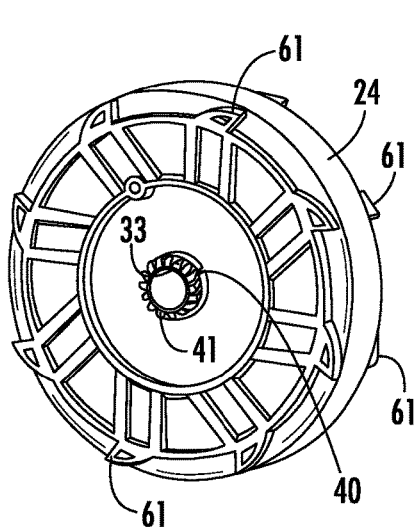
FIG. 4A is a right side perspective view of an embodiment of a spool for use with the retractable leash assembly as shown in FIG. 3.
Figure 4B:
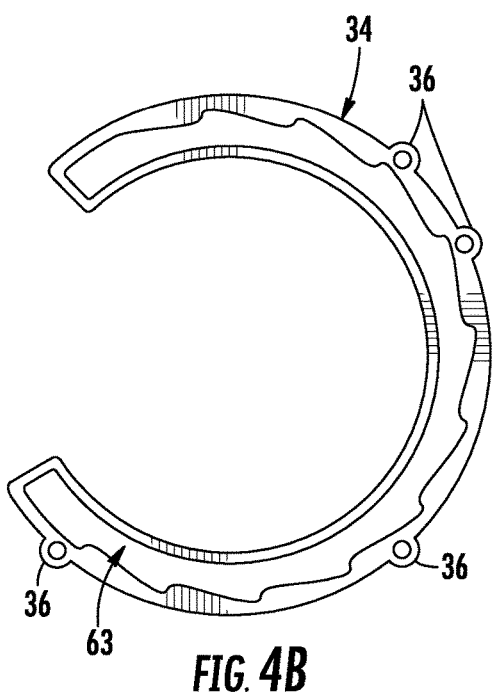
FIG. 4B is a right side elevation view of an embodiment of a center support for use with the retractable leash assembly as shown in FIG. 3.

The housing 22 includes a right half side 30 of the housing, a left half side 32 of the housing and a C-shaped center support member 34 (FIG. 4B). The right half and left half sides 30, 32 of the housing 22 are substantially mirror images of one another. The right half and left half sides 30, 32 of the housing 22 may be joined together on either side of the center support 34. For this purpose, corresponding ears 36 may be integrally formed along the peripheral edges of the right half and the left half sides 30, 32 of the housing 22 and the center support 34. The ears 36 protrude radially outwardly from the housing 22 and the center support 34 and are configured to receive fasteners (not shown) for securing together the components of the housing 22. As shown in FIG. 2, a central axial spindle 38 extends inwardly from the inner surface of the right side half 30 of the housing 22. The left half side 32 of the housing 22 has a central axial opening 33 for receiving the spindle 38. The spindle rotatably supports a control knob 54 on the outside surface of the left half side 32 of the housing 22 (FIG. 1).

The housing 22 may be formed from a plastic material, light metal or the like. In one embodiment, the center support 34 may also be molded or otherwise integrated with one of the side halves 30, 32 of the housing 22. It is understood that other means for joining the components of the housing 22 are possible and in such case the ears 36 may be eliminated. For example, when the housing 22 is formed from a plastic, plastic solvent cement may be used to secure together the components of the housing 22.

Referring to FIGS. 2 and 3, the housing 22 is configured to accommodate a spool 24 and a carrier linkage 42 having associated gear train. The spool 24 comprises spaced parallel plates having a central axial hub 40 defining an opening 33. As shown in FIG. 4, the right inside end of the central hub 40 of the spool 24 has radial gear teeth 41. The plates of the spool 24 include axially projecting teeth 61 circumferentially spaced along the periphery of each plate. When the housing 22 is assembled, the spindle 38 passes through the opening 33 in the central axial hub 40 of the spool 24 for supporting rotation of the spool 24 relative to the housing 22. The leash 21 (not shown) is wound on the hub 40 of the spool 24 between the plates. As is conventional, the leash 21 can be unwound from the spool 24 against the force of a coil spring (not shown) acting on the spool. As the leash 21 extends the spring is loaded for automatically rewinding the leash 21 onto the spool 24 with the aid of the spring force.

Figure 5:
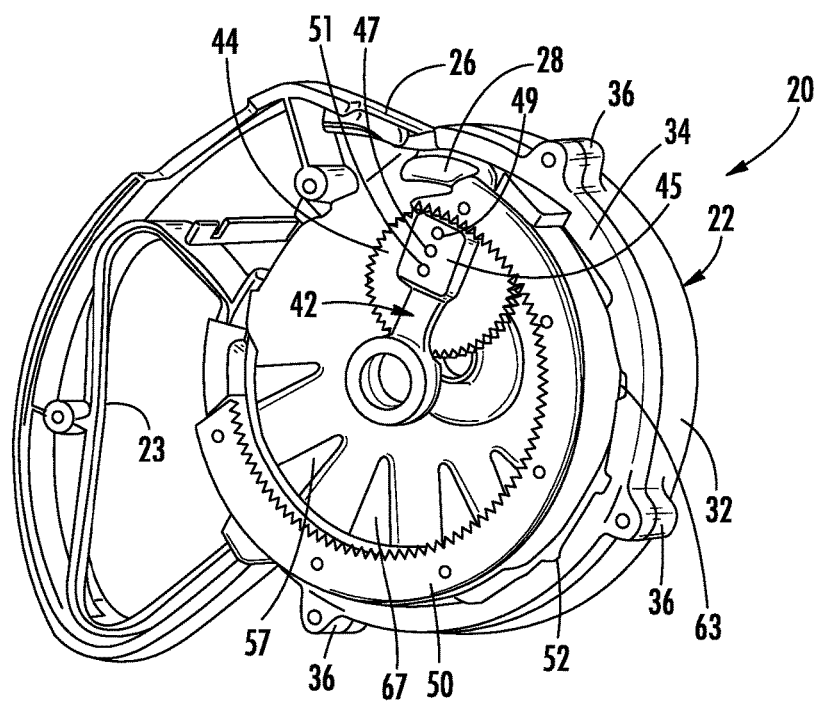
FIG. 5 is a right side perspective view of the retractable leash assembly as shown in FIG. 3 with the spool removed for clarity.

As shown in FIGS. 3 and 5, the carrier linkage 42 and associated gear train are arranged for rotation between the spool 24 and the right side half 30 of the housing 22. The carrier linkage 42 is an elongated member having a circular hub 43 at a proximal end and a gear box 45 at a distal end. The hub 43 of the carrier linkage 42 defines an opening for rotatably receiving the spindle 38. The gear box 45 houses a portion of the gear train including an intermediate gear 46 which meshes with a small outer gear 48. Both small gears 46, 48 rotate freely on pins 47, 49 passing through the gear box 45. The edge of the outer gear 48 extends from a distal opening in the gear box 45. A compound gear 44 including a small central axial gear 53 is rotatably supported on a pin 51 passing through the gear box 45. The compound gear 44 meshes with the gear teeth 41 on the hub 40 of the spool 24 and the small central axial gear 53 operatively meshes with the intermediate gear 46. The gear train is completed by a C-shaped pinion gear 50 secured to right side half 30 of the housing 22 adjacent the spool 24. The portion of the outer gear 48 extending from the gear box 45 meshes with the gear teeth of the pinion gear 50. Rotation of the spool 24 thus drives the gears 44, 46, 48 of the carrier linkage 42 so that the carrier linkage 42 rotates in the opposite direction of the spool 24 in a defined range as the leash is extended or retracted. In one embodiment, the carrier linkage 42 rotates in a fixed transmission ratio to the rotation of the spool of, for example, 30:1. The transmission ratio allows the carrier linkage 42 to make one full traverse of the pinion 50 from an upper end of the pinion gear 50 (as seen in FIG. 3) when the leash 21 is fully retracted to an opposite end of the pinion gear 50 when the leash 21 is fully extended.

Figure 6:
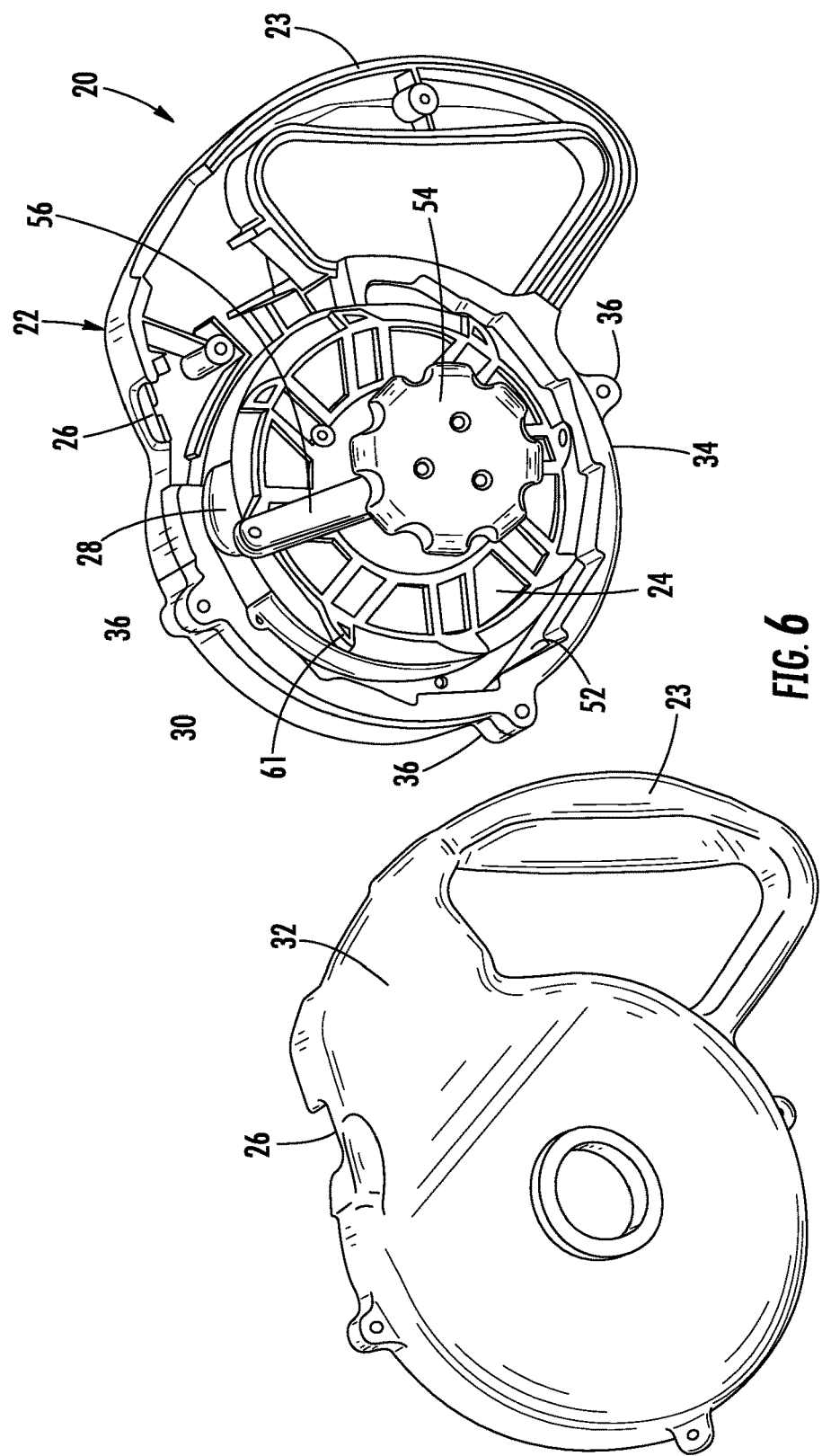
FIG. 6 is a left side perspective view of the retractable leash assembly as shown in FIG. 1 with the left side of a housing exploded.
Figure 7:
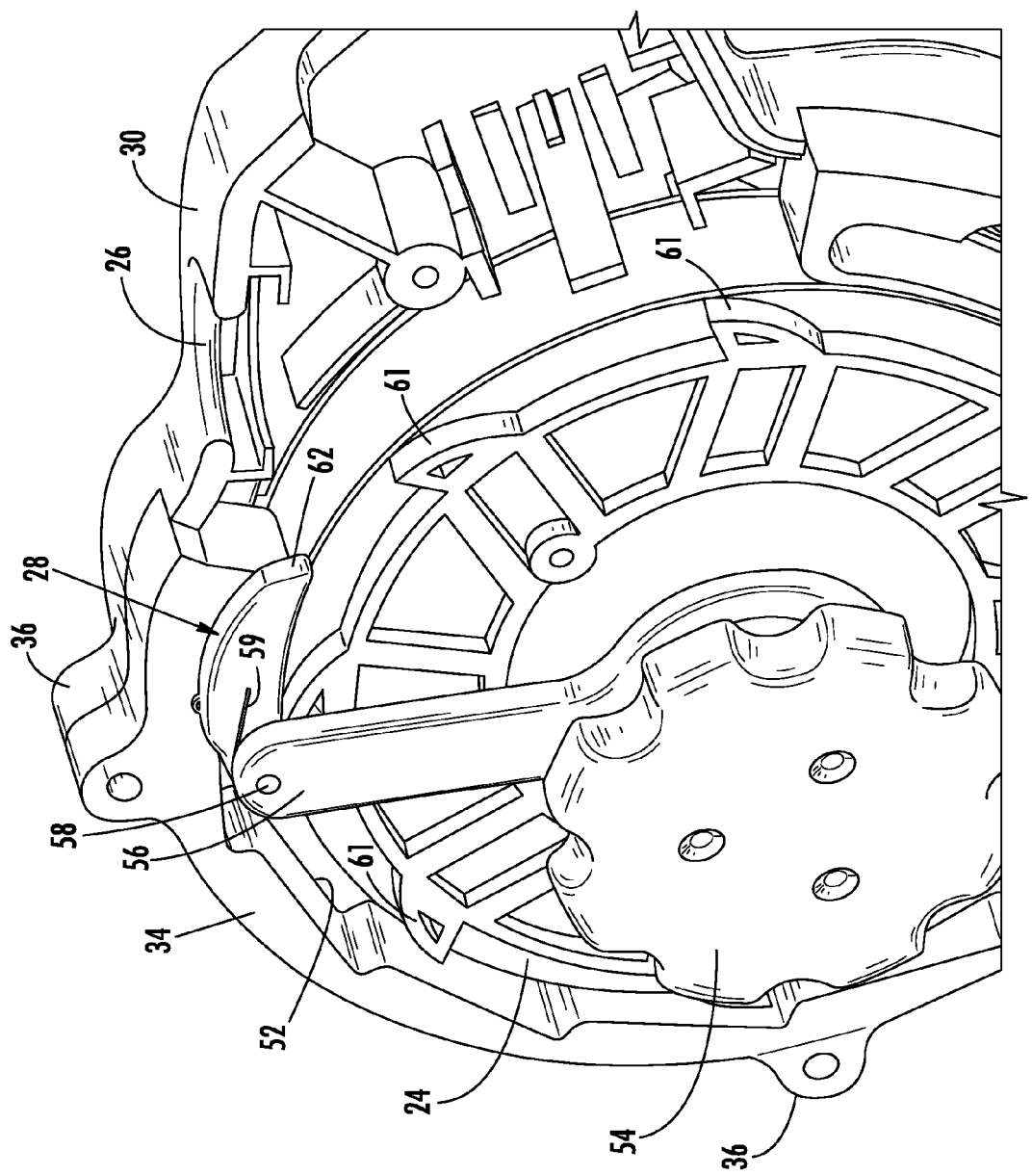
FIG. 7 is a close-up left side perspective view of the retractable leash assembly as shown in FIG. 6.
Figure 8:
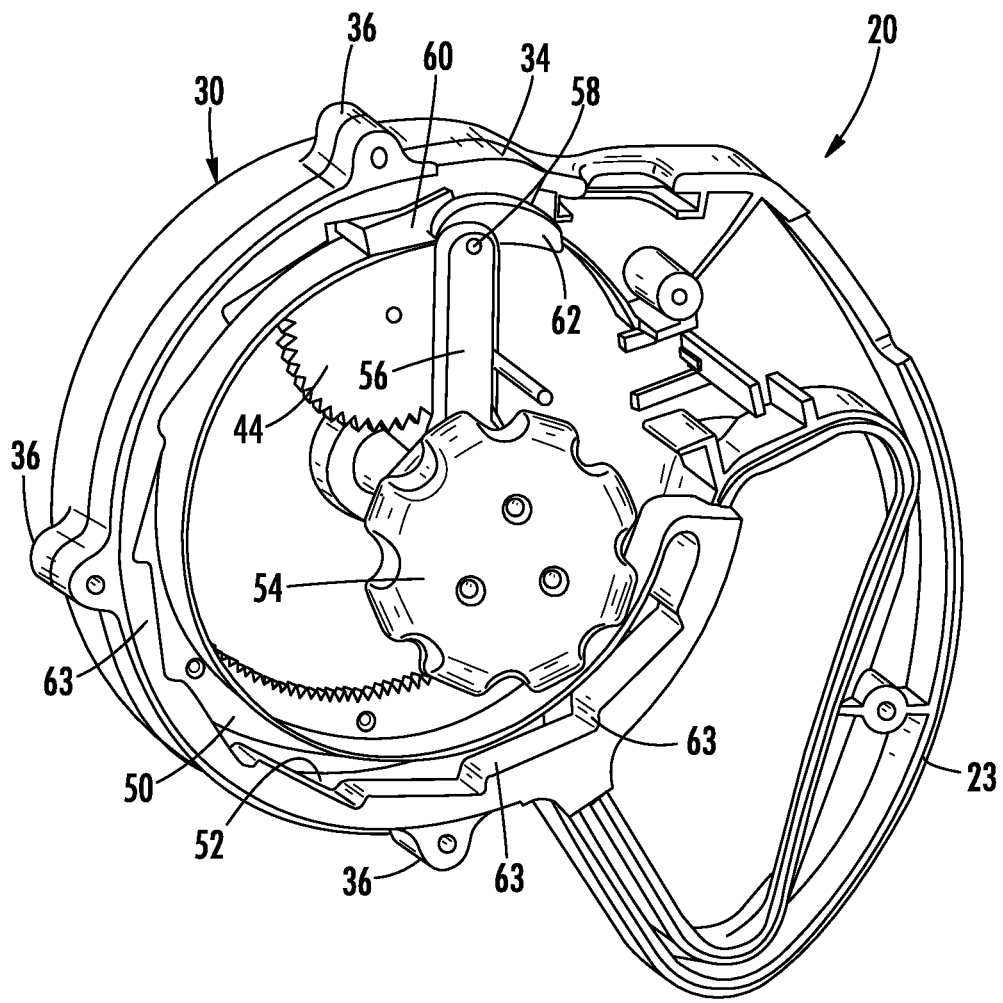
FIG. 8 is a left side perspective view of the retractable leash assembly as shown in FIG. 6 with the spool removed for clarity.

Referring to FIGS. 6-8, the control knob 54 is operatively connected with fasteners (not shown) to a knob link 56 and a lockout pawl 28 in the housing 22. The knob link 56 is an elongated planar member having a generally circular proximal end defining an opening 55 for journaling the spindle 38. The knob link 56 extends radially outwardly between the spool 24 and the left half side 30 of the housing 22 from the spindle 38 to a thin distal end of the knob link 56. The distal end of the knob link 56 is connected via a pin 58 for movement together with a pivoting lockout pawl 28. The pin 58 extends transversely between the knob link 56 and the pawl 28.

The lockout pawl 28 comprises a central lever portion 60 extending forwardly and rearwardly from the axis of rotation of the pawl 28 and a pair of parallel opposed stop arms 62 extending rearwardly from the axis of rotation on each side of the lever portion 60. The lever portion 60 of the lockout pawl 28 is configured to be slidingly received in a closed longitudinal slot 52 defined by the center support 34. In this arrangement, each stop arm 62 is in the same plane as the teeth 61 on the outside surfaces of the plates of the spool 24. The lockout pawl 28 pivots in the slot 52 between a first position and a second position. A torsion spring 59 on the pin 58 biases the pawl 28 in a counter-clockwise direction as seen in FIGS. 6-8 to the first position.

In the second position of the lockout pawl 28 (FIGS. 9 and 10), the stop arms 62 engage the teeth 61 on the peripheral edges of the spool 24 and the lever portion 60 of the pawl 28 engages one of a plurality of cogs 63 in the center support 34. This position of the lockout pawl 28 prevents rotation of the spool 24 in the leash extension direction. The carrier linkage 46 is configured to pivot the pawl 28 to the second position. Because the spool 24 is operatively connected with the carrier linkage 42 through the gear train, the carrier linkage 42 rotates with the spool 24, albeit at a slower speed. The carrier linkage 42 has a distal cam 64 for engaging a tab on the lockout pawl 28 for driving the lockout pawl 28 to the second position once a selectively predetermined length of the leash is unwound.

Figure 9:
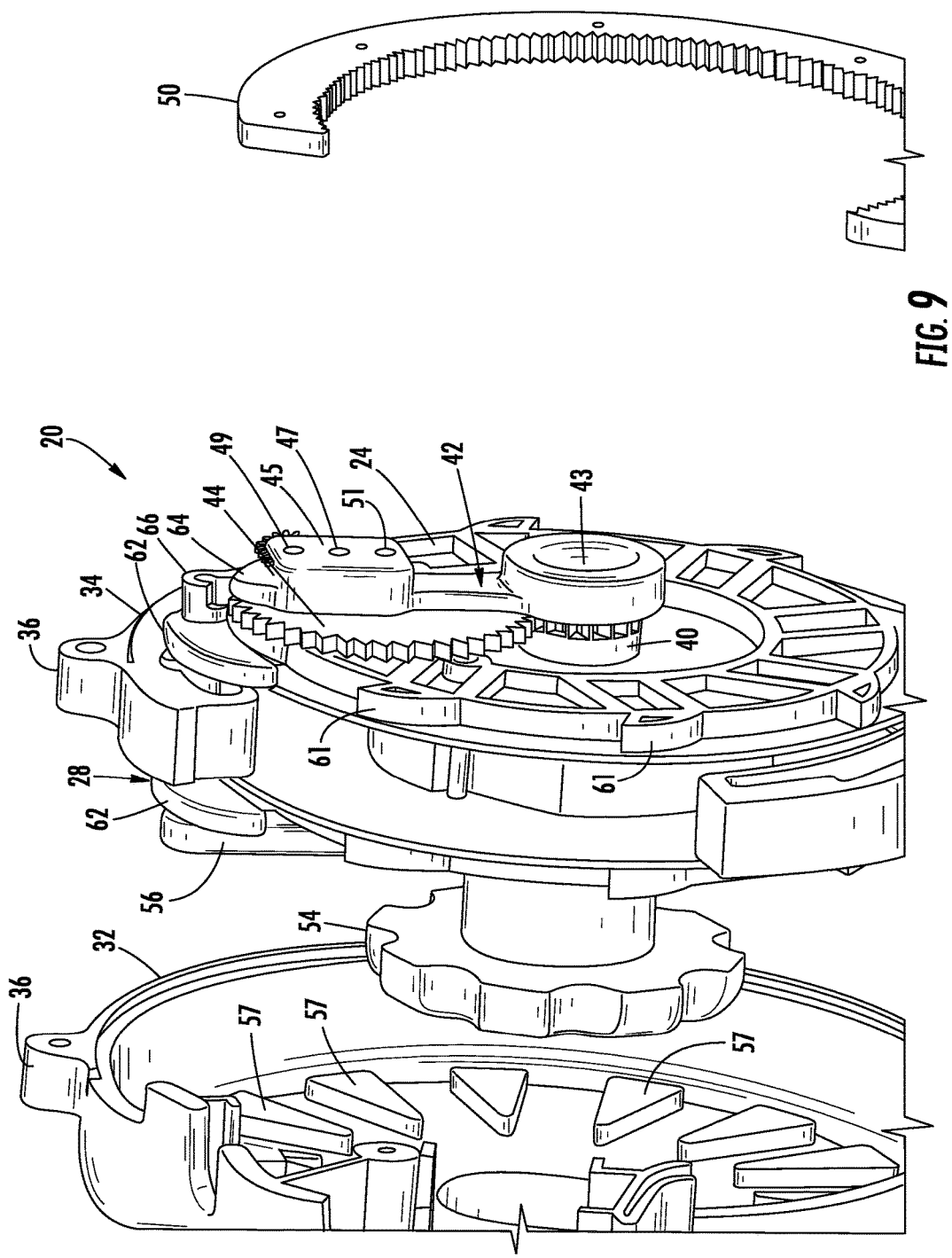
FIG. 9 is a partial right side front exploded perspective view of the retractable leash assembly as shown in FIG. 3 showing a lockout pawl in a first position.
Figure 10:
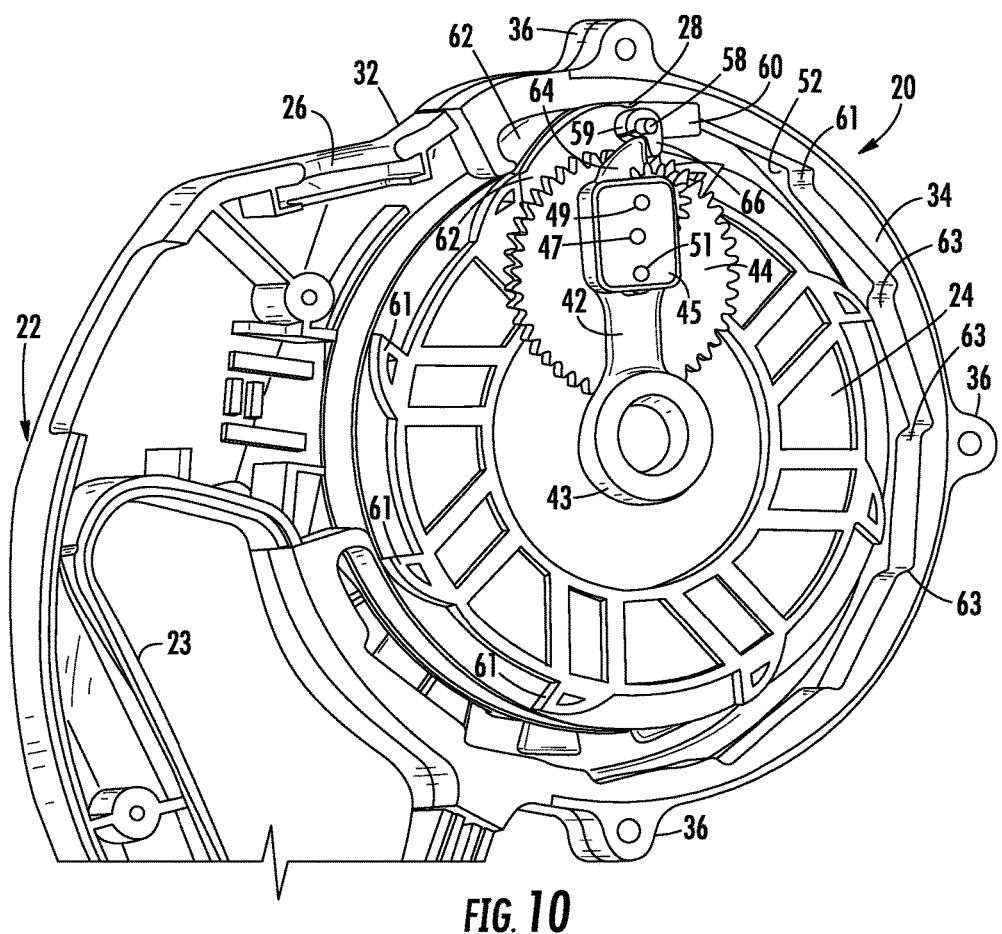
FIG. 10 right side elevation view of the retractable leash assembly as shown in FIG. 3 showing a lockout pawl in the first position as shown in FIG. 9.
Figure 11:
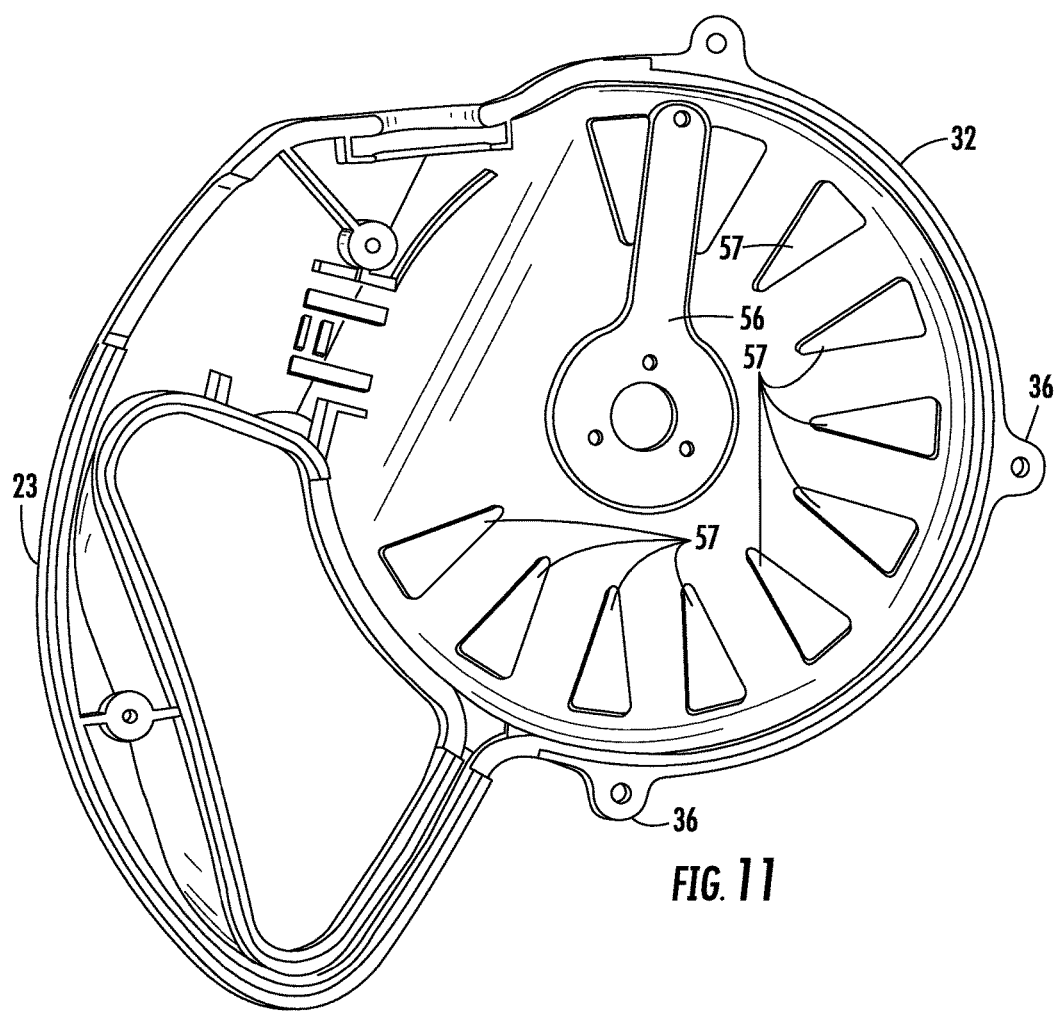
FIG. 11 is an elevation view of an inner surface of the left side of the housing showing a knob link in a first position.

The maximum extended length of the leash 21 can be selectively chosen by positioning the pawl 28 along the slot 52 in the center support 34 by manipulating the control knob 54. Referring to FIG. 11, the distal end of the knob link 56 is configured to be received in any one of ten positions defined in the inner surface of the left side half 32 of the housing 22 between spaced inwardly extending triangular projections 57. The knob link 56 may be selectively positioned between any two of the projections 57 by rotation of the control knob 54 by the user. As will described below, each of the positions of the knob link 56 corresponds to a maximum extended length of the leash In use, the user selects of the position of the knob 54, knob link 56 and the lockout pawl 28 relative to any one of the ten positions between the projections 57 on the inside left side half 32 of the housing 22. Each position corresponds to a maximum length of extension of the leash 21. In one position, shown in FIGS. 9-11, the lockout pawl 28 is at one end of the slot 52 in the center support 34. In this position, the leash 21 can be unwound from the spool 24 until the cam surface 64 on the distal end of the carrier linkage 42 engages the actuating tab 66 on the pawl 28. Continued rotation of the carrier linkage 42 causes the lockout pawl 28 to pivot in a counter-clockwise direction, as seen in FIGS. 9 and 10, to the second position. In the second position, the stop arms 62 are moved into engagement with unidirectional teeth 61 on the outer surfaces of the spool 24 and the lever portion 60 of the pawl 28 engages one of the plurality of circumferentially spaced cogs 63 in the center support 34. In this position, the lockout pawl 28 locks the spool 24 from rotation in a leash extension direction relative to the center support 34, which immediately stops pay out of the leash 21 and prevents the animal from moving farther away. Thus, only the selected length of the leash 21 is available as the pawl 28 engages with the spool 24 and the center support 34 once the maximum length is reached as predetermined by the position of the carrier linkage 42 and the pawl 28. The leash 21 can no longer be additionally unwound beyond the selected maximum length.

Figure 12:
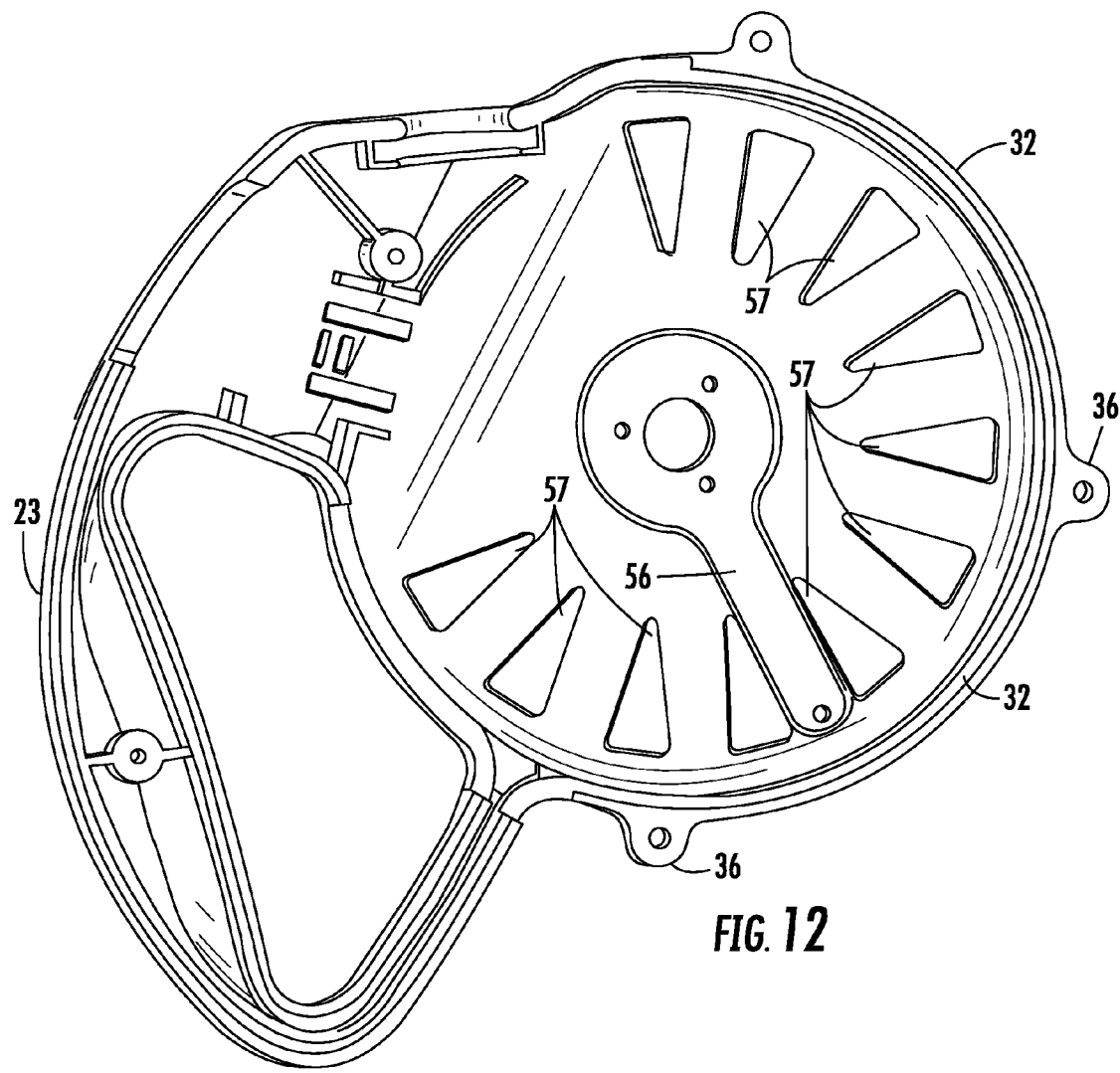
FIG. 12 is an elevation view of the inner surface of the left side of the housing showing the knob link in a second position.
Figure 13:
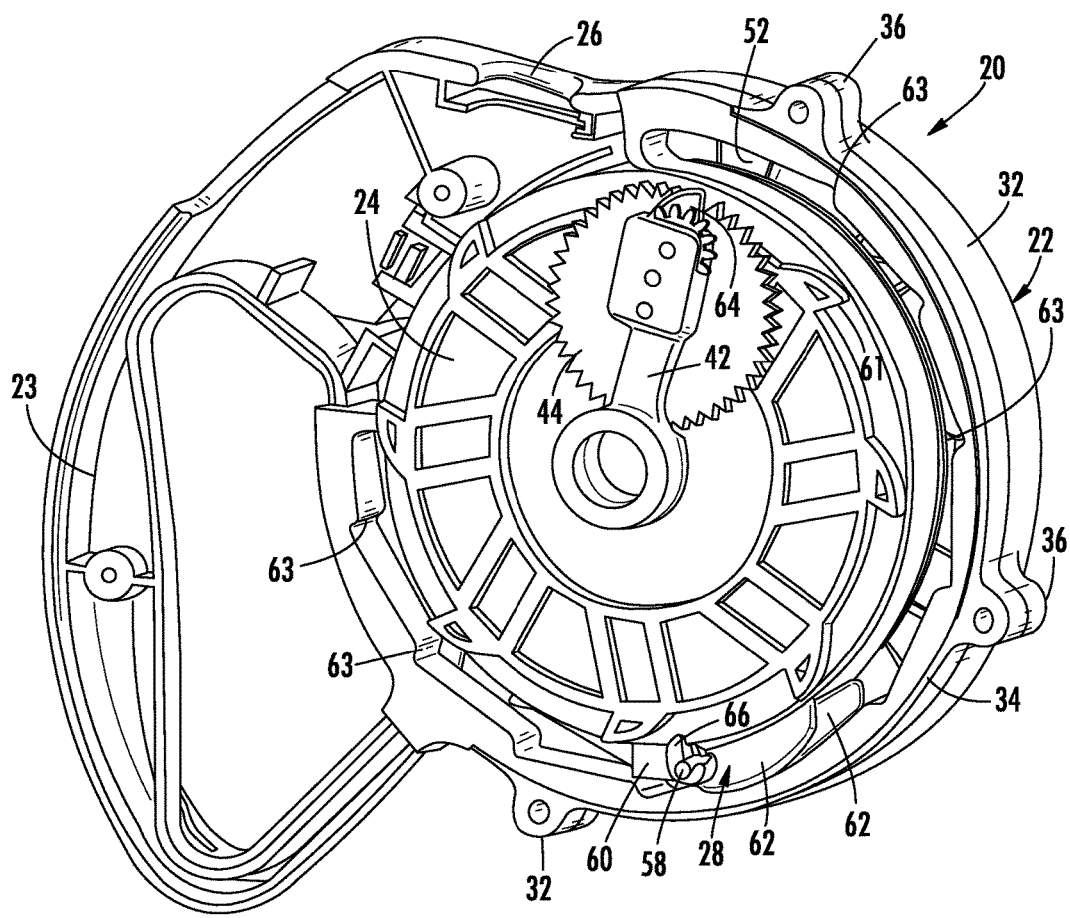
FIGS. 13 and 14 are right side elevation views of the retractable leash assembly as shown in FIG. 3 with the right side of the housing removed showing the lockout pawl in a second position.
Figure 14:
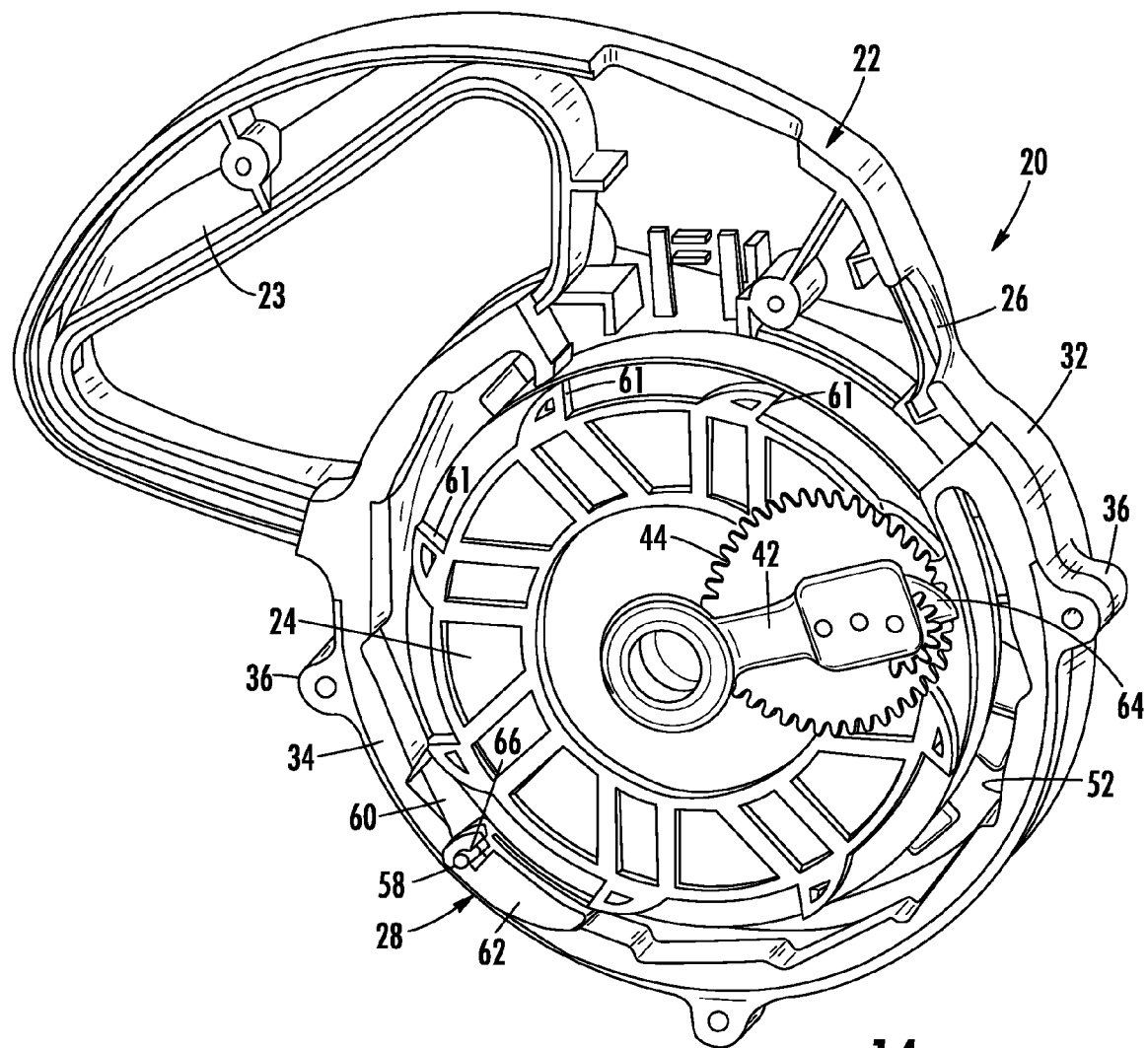
Figure 15:
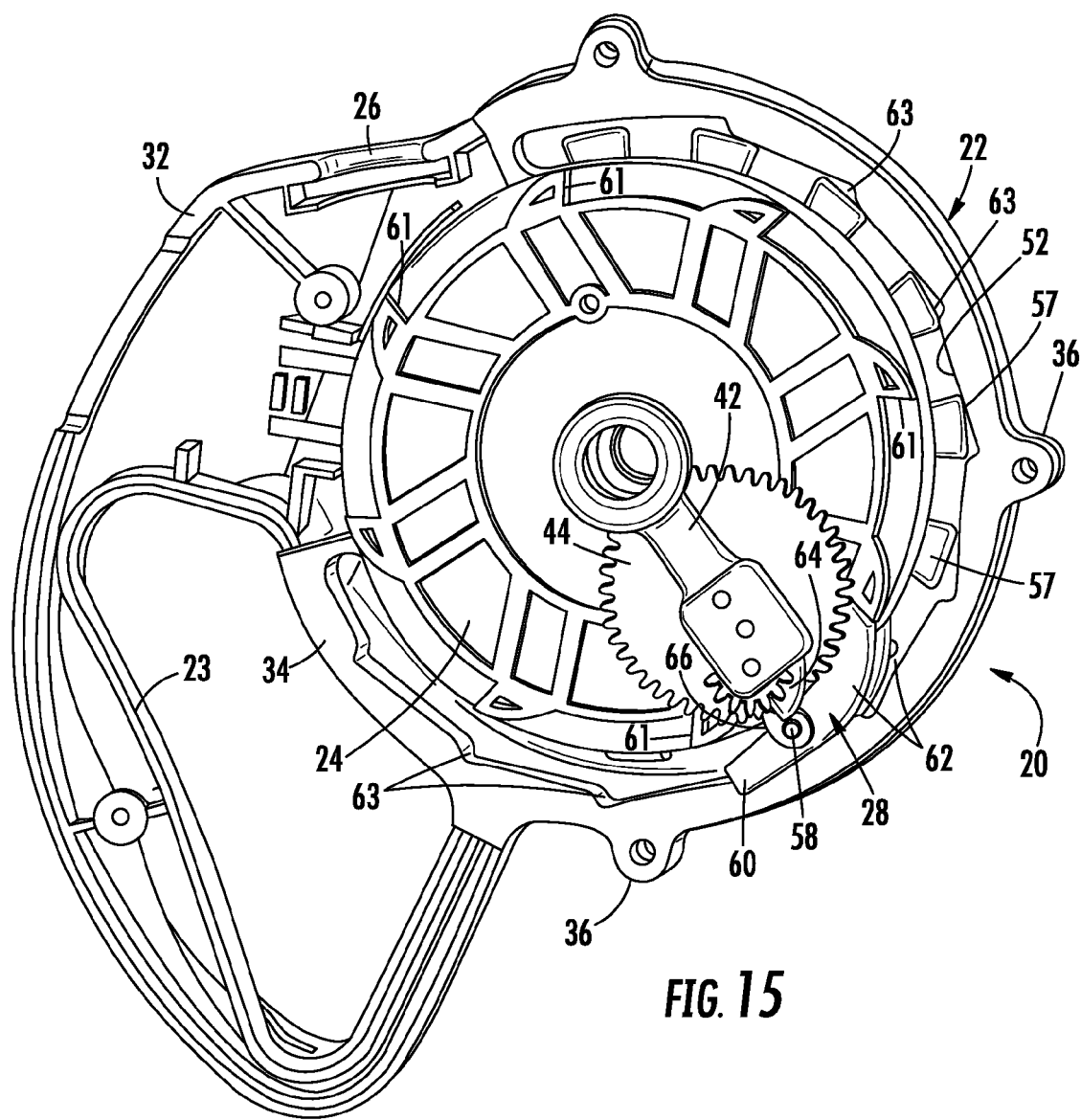
FIGS. 15 and 16 are right side elevation views of the retractable leash assembly as shown in FIG. 3 with the right side of the housing removed showing a distal end of the carrier linkage engaging the lockout pawl in the second position as shown in FIGS. 12 and 13.
Figure 16:
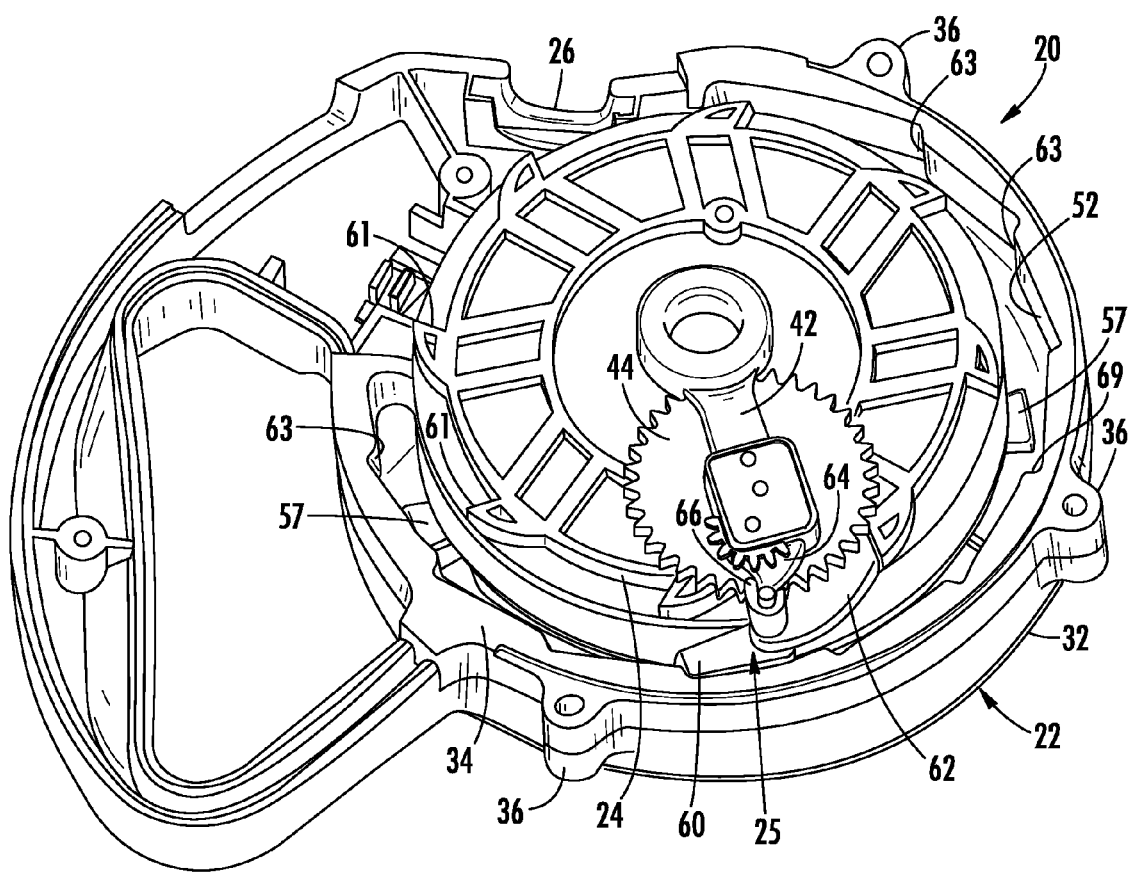

FIG. 12 shows the knob link 56 in another selected position between the projections 57 in the left side half 32 of the housing 22. This position of the knob link 56 corresponds to a different maximum length of leash 21. To select this position, the user pushes the control 54 knob inwardly to move the knob 54 and the knob link 56 inwardly of the housing 22 against the force of a wave spring 68. The knob link 56 moves inwardly and out of the slot between projections 57 and is free to turn with the knob 54. When the user releases the knob 54, the knob link 56 moves into the selected position between projections 57 as shown, for example, in FIG. 12. In this position, the carrier linkage 42 must rotate with the spool 24 from the position shown in FIGS. 13 and 14 to engage the lockout pawl 28. FIGS. 15 and 16 depict the carrier linkage 42 engaging actuating tab 66 and moving the pawl 28 to the second position for stopping extension of the leash 21. Note that if the knob link 56 is left in a position where the distal end of the knob link 56 is not seated between projections 57, the carrier link 42 will rotate the lockout pawl 28 until the ratchet teeth 61 of the spool 24 engage the pawl 28 and move the knob link 56 into the next slot between projections 57 in the longer leash length direction. This arrangement prevents jamming of the mechanism.

Figure 17:
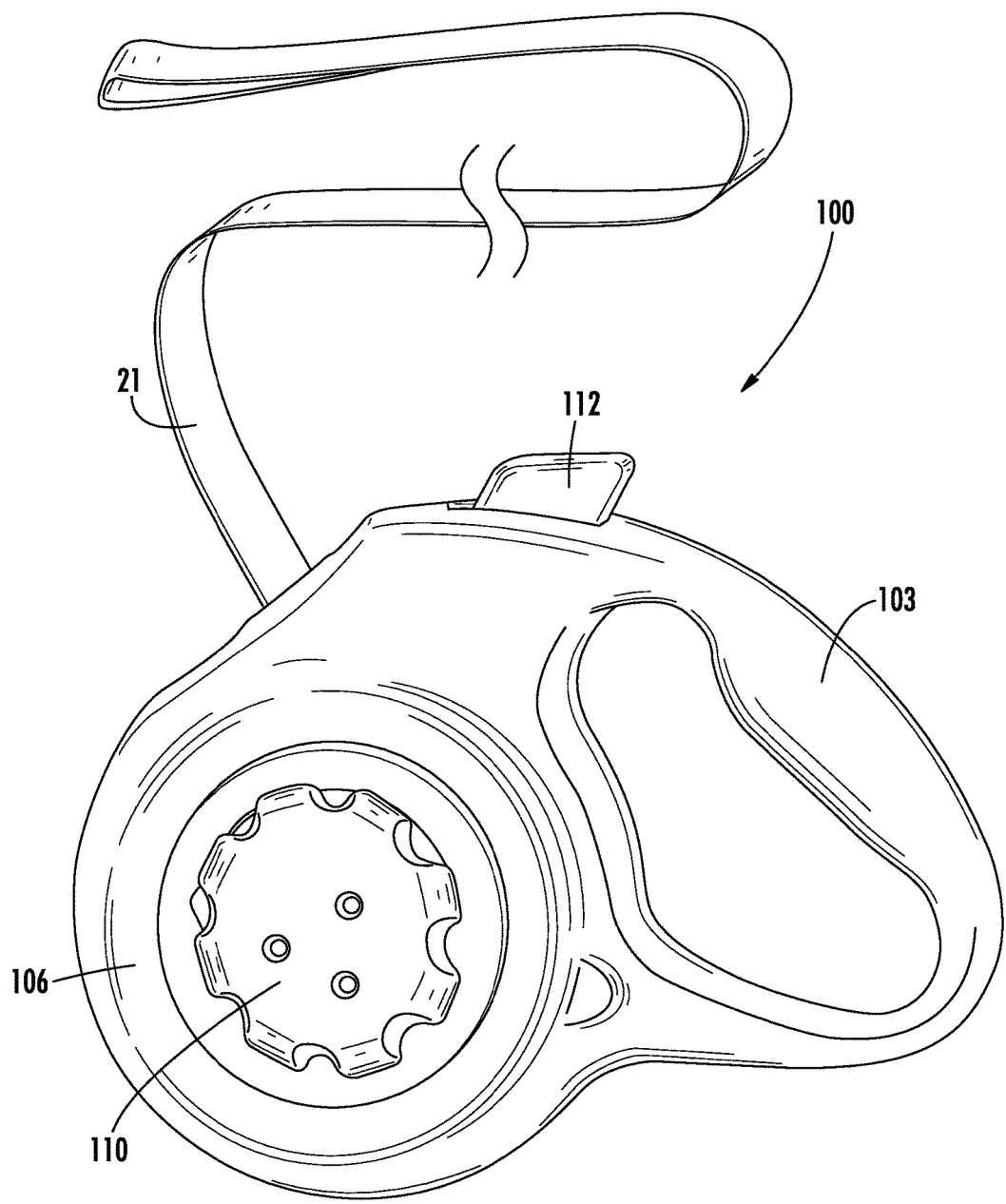
FIG. 17 is a left side perspective view of another embodiment of an apparatus for use as a retractable leash assembly.
Figure 18:
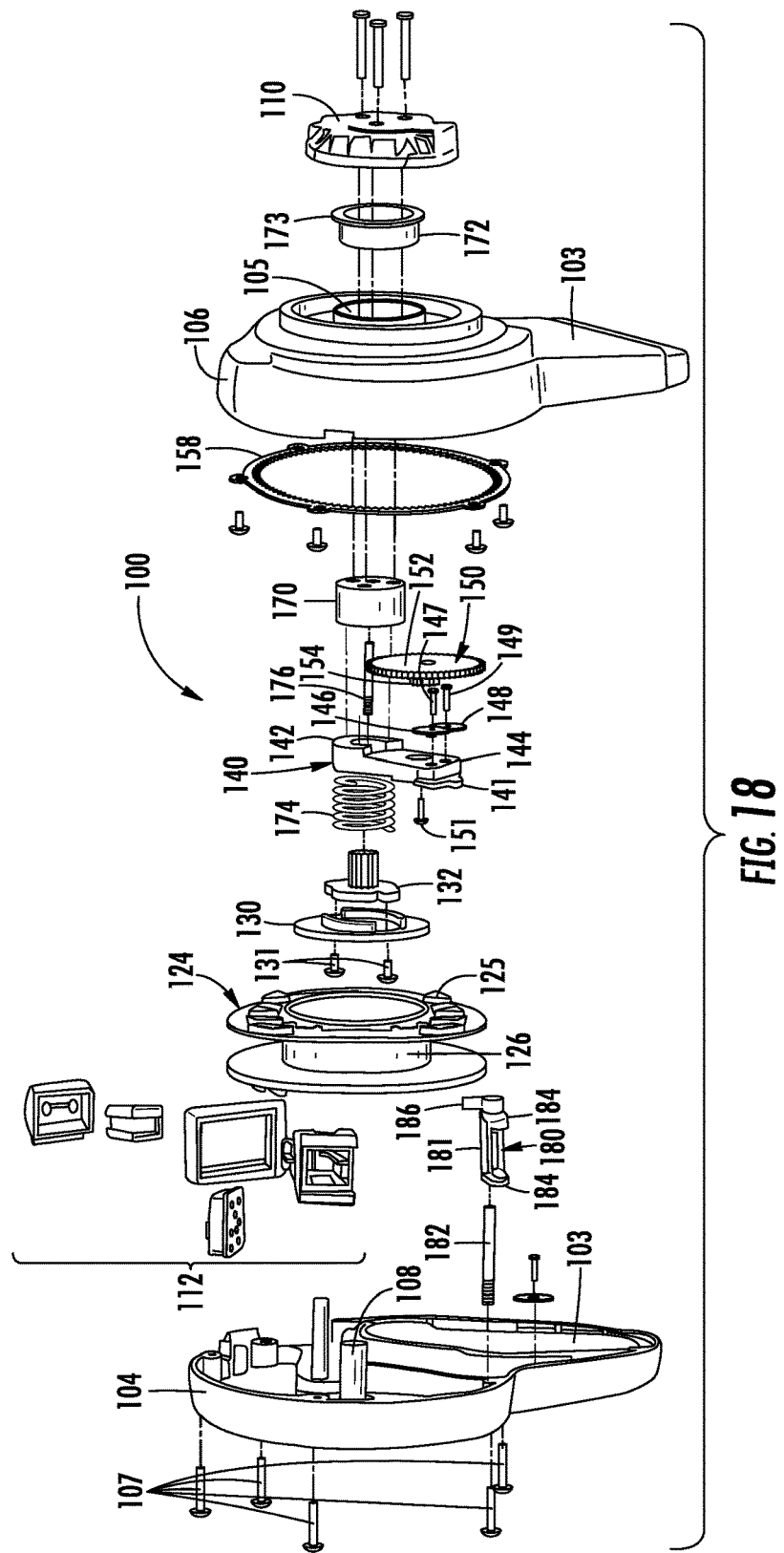
FIG. 18 is an exploded front elevation view of the retractable leash assembly as shown in FIG. 17.

Another embodiment of a retractable leash assembly is shown in FIGS. 17 and 18 and generally designated at 100. This embodiment of the leash assembly 100 comprises the conventional leash 21 and a housing 102 including a rearwardly extending handle 103. The leash extends from a slot 116 in the housing 102. The leash assembly 100 may also include a conventional leash braking means 112 that functions to manually stop extension and retraction of the leash 21 relative to the housing 102. The leash braking means 112 makes it possible for the user to lock the leash at any desired extended length.

The housing 102 includes a right half side 104 of the housing and a left half side 106 of the housing. The right half and left half sides 104, 106 of the housing 102 are substantially mirror images of one another and may be joined together by fasteners 107 for securing therein the components of the leash assembly 100. As shown in FIG. 18, a central axial spindle 108 extends inwardly from the inner surface of the right side half 104 of the housing 102. The left side half 106 of the housing 102 has a central axial opening 105 for receiving the spindle 108. A control knob 110 is rotatably supported on the outside surface of the left half side 106 of the housing 102 (FIG. 17).

As with the previous embodiment, the housing 102 may be formed from a plastic material, light metal or the like. It is also understood that other means for joining the components of the housing 102 are possible. For example, in the case of plastic forming the housing 102, plastic solvent cement may be used to secure together the components of the housing.

Figure 19:
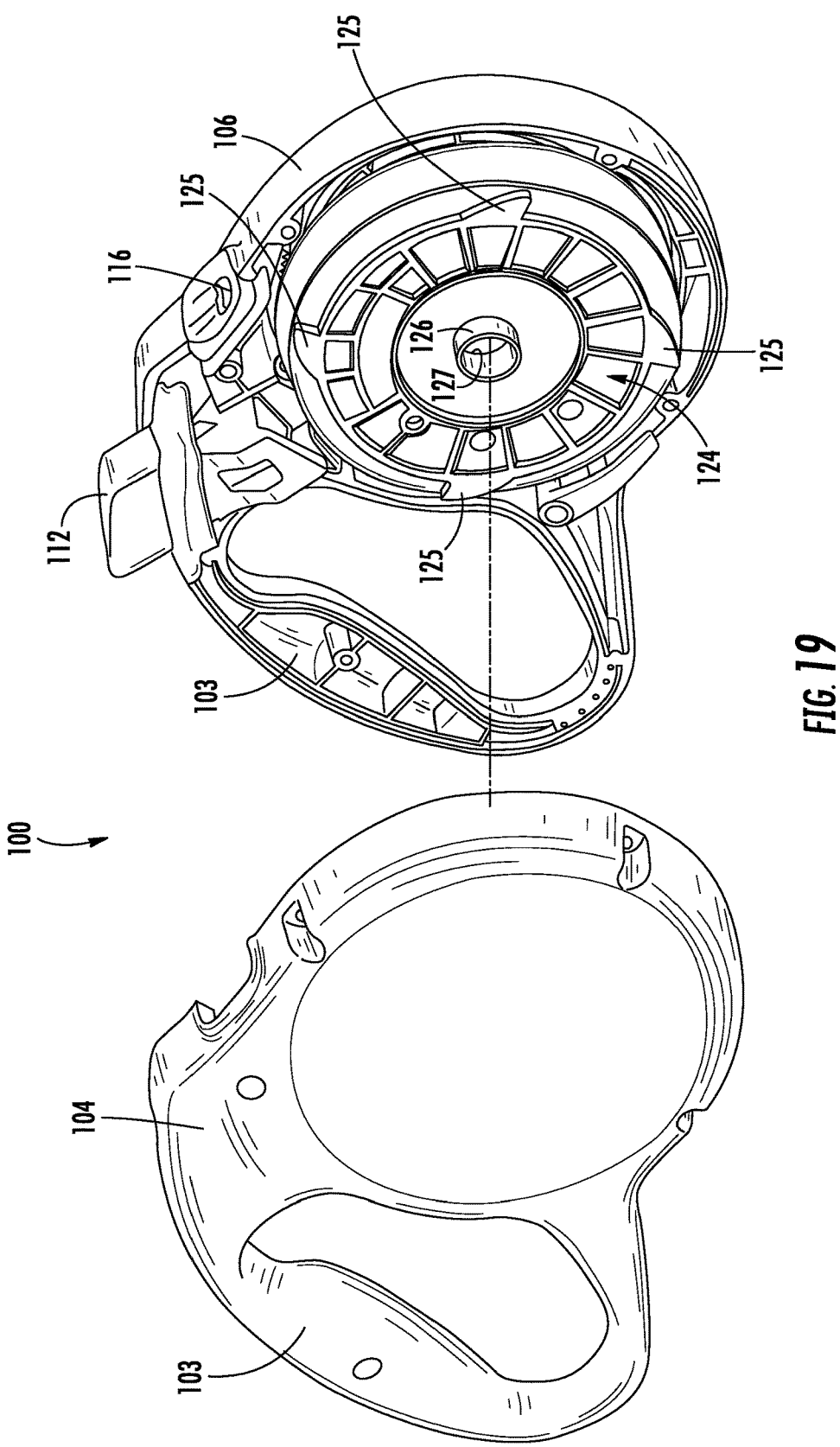
FIG. 19 is a right side perspective view of the retractable leash assembly as shown in FIG. 17 with the right side of a housing exploded.
Figure 22A:
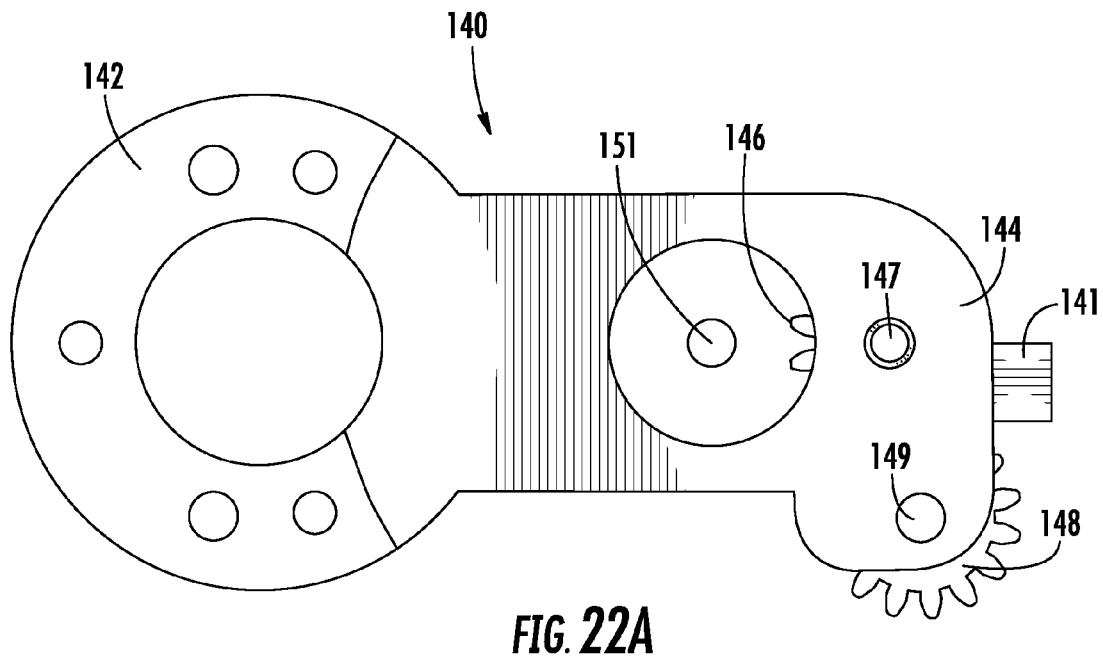
FIG. 22A is a left side elevation view of an embodiment of a carrier linkage for use with the retractable leash assembly as shown in FIG. 17.
Figure 22B:
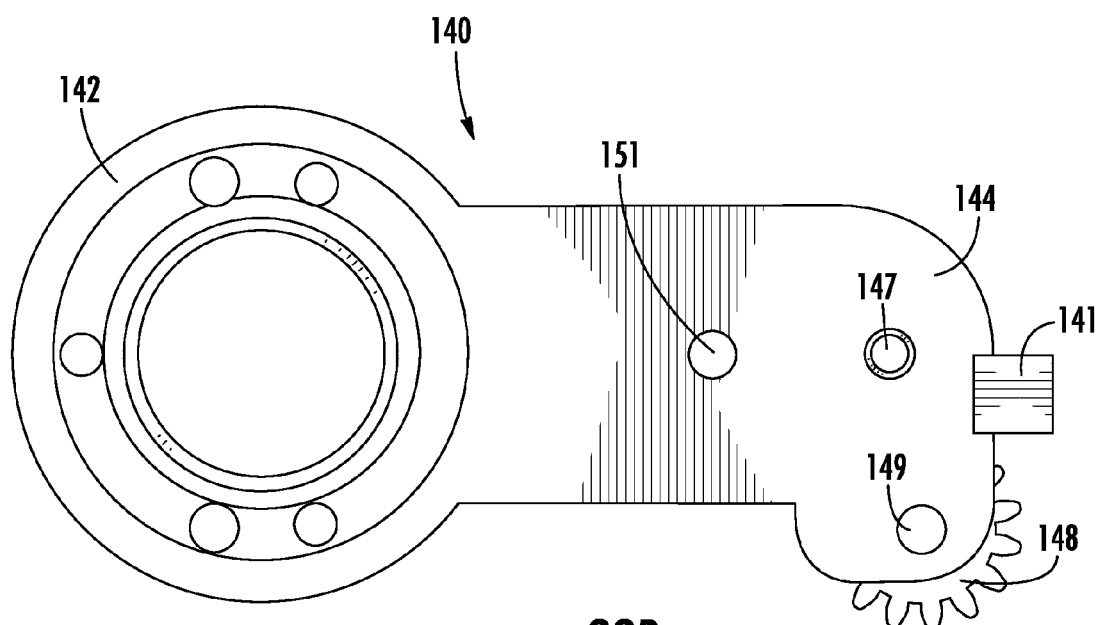
FIG. 22B is a right side elevation view of the carrier linkage as shown in FIG. 22A.
Figure 23:
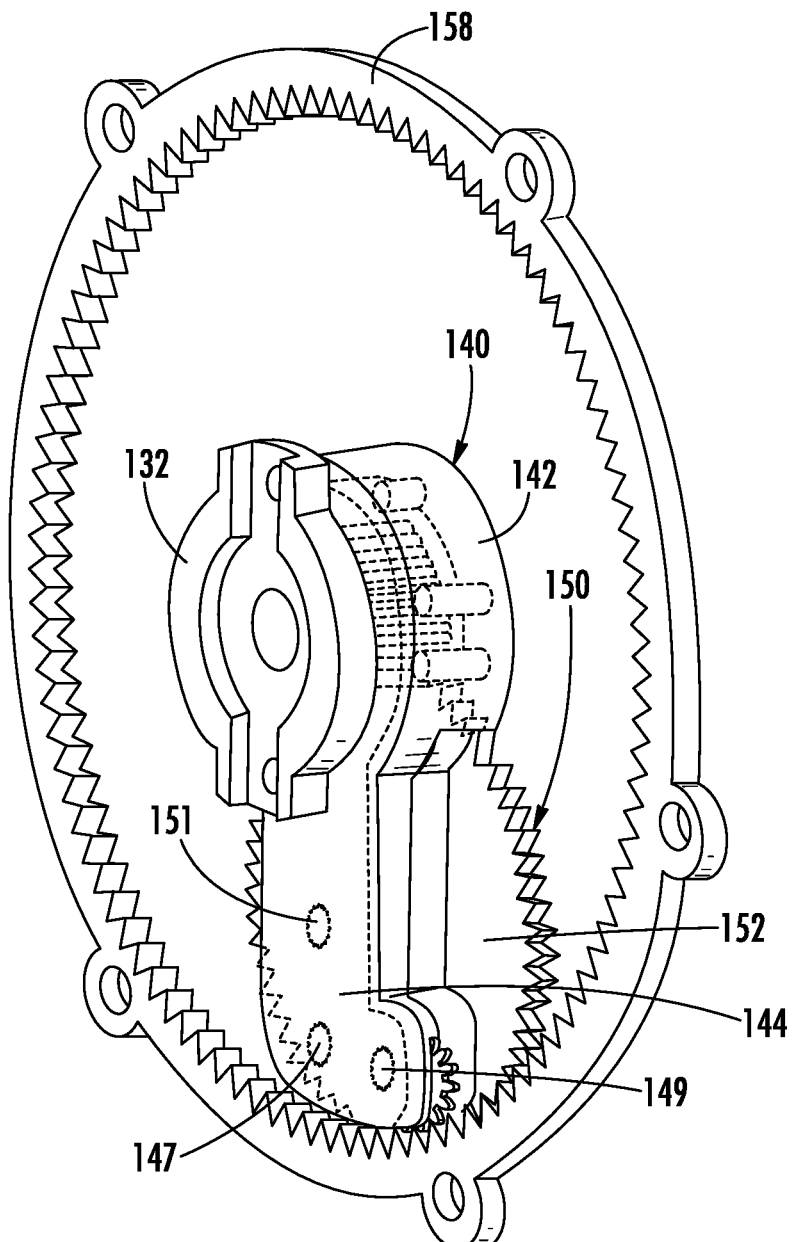
FIG. 23 is a right side perspective view of an embodiment of a gear train including the carrier linkage for use with the retractable leash assembly as shown in FIG. 17.

Referring to FIGS. 18 and 19, the housing 102 is configured to accommodate a spool 124 and a carrier linkage 140 having an associated gear train. The spool 124 comprises spaced parallel plates having a central axial hub 126 defining an opening 127 (FIGS. 21A and 21B). A circular plate member 130 has a central axial opening which fits over the left end of the hub 126. The plate member 130 carries a central axial shaft 132 including axial splines. The opening in the plate 130 has a contiguous slot for receiving a longitudinal key integral with the hub 126 such that the plate 130 and shaft 132 rotate together with the spool 124. The outer surfaces of the plates of the spool 124 include axially projecting teeth 125 circumferentially spaced along the periphery of each plate. When the housing 102 is assembled, the spindle 108 passes through the opening 127 in the central axial hub 126 of the spool 124 for supporting rotation of the spool 124 relative to the housing 102. The leash 21 is wound on the hub 140 of the spool 124 between the plates. As is conventional, the leash 128 can be unwound from the spool 124 against the force of a coil or clock spring (not shown) acting on the spool. As the leash 21 extends the spring is loaded for automatically rewinding the leash 21 onto the spool 124 with the aid of the spring force.

Figure 26A:
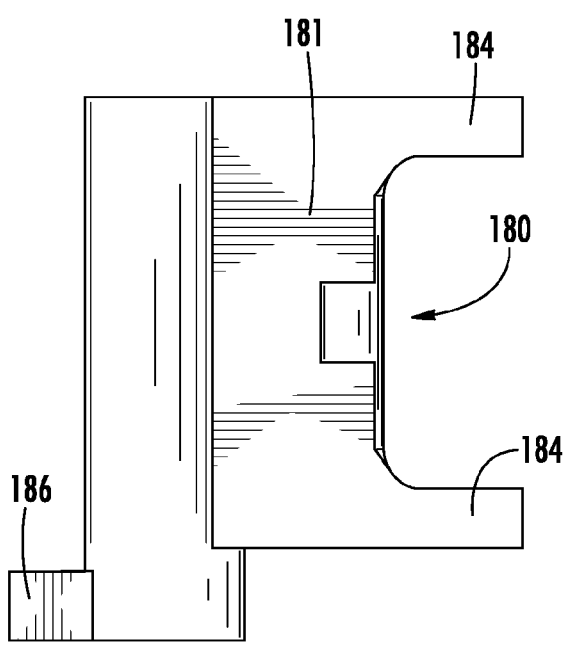
Figure 26B:
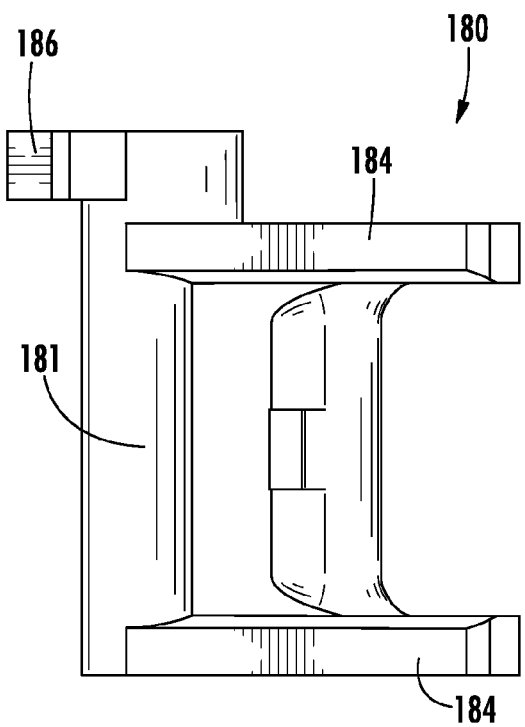
Figure 26C:
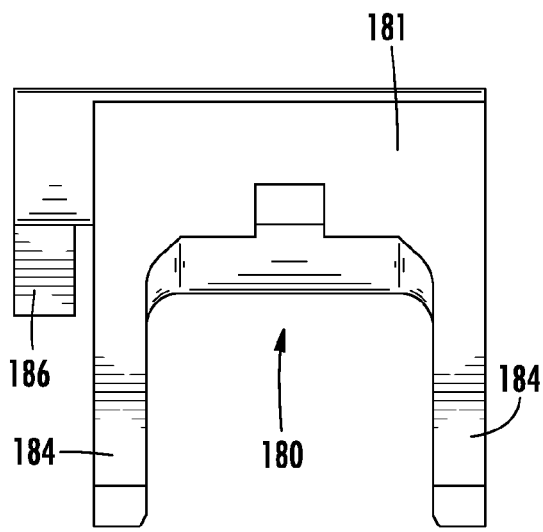
Figure 26D:
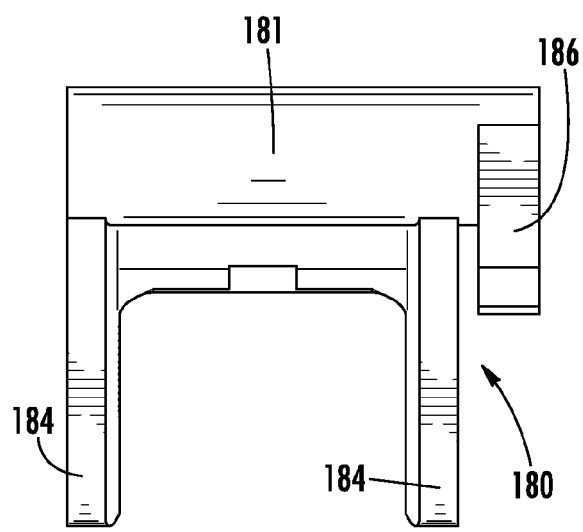

As shown in FIGS. 20 and 22A-23, the carrier linkage 140 and associated gear train are arranged for rotation between the spool 124 and the left half side 106 of the housing 102 of the retractable leash assembly 100. The carrier linkage 140 is an elongated member having a circular hub 142 at a proximal end and a gear box 144 at a distal end (FIGS. 26A and 26B). The hub 142 of the carrier linkage 140 defines an opening for rotatably receiving the spindle 108. The gear box 144 houses a portion of the gear train, including a small intermediate gear 146 which meshes with a small outer gear 148. The intermediate and outer gears 146, 148 rotate freely on pins 147, 149 passing through the gear box 144. A portion of the outer gear 148 extends from an opening in the gear box 144. A compound gear 150 is also rotatably supported on a pin 151 also passing through the gear box 144. The compound gear 150 includes a large gear 152 and a small central axial gear 154. The large compound gear 150 meshes with the splines on the shaft 132 of the spool 124. The small central axial gear 154 meshes with the intermediate gear 146. The gear train is completed by a circular ring gear 158 secured with fasteners to the inside surface of the left side half 106 of the housing 102. The outer gear 148 meshes with the gear teeth of the ring gear 158. Rotation of the spool 124 drives the gears 132, 146, 148, 150 of the carrier linkage 140 so that the carrier linkage 140 rotates in a direction opposite to the spool 124 in a defined range as the leash 21 is extended or retracted. In one embodiment, the carrier linkage 140 rotates in a fixed transmission ratio to the rotation of the spool of, for example, 30:1. The transmission ratio allows the carrier linkage 140 to make a traverse of about 300° of the ring gear 158 when the leash moves from the being fully retracted to fully extended.

Figure 24:
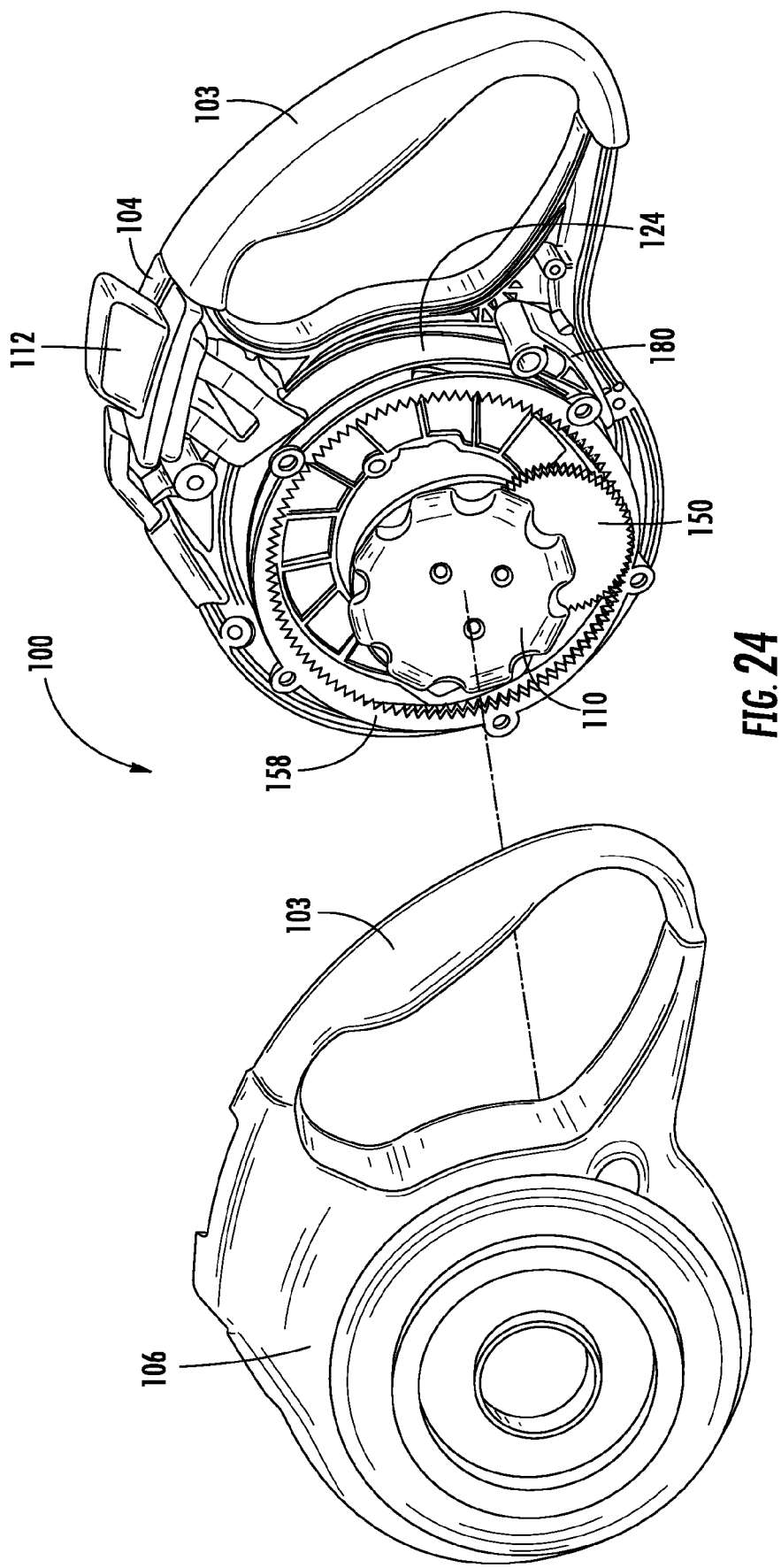
FIG. 24 is a left side perspective view of the retractable leash assembly as shown in FIG. 1 with the left side of a housing exploded.
Figure 25:
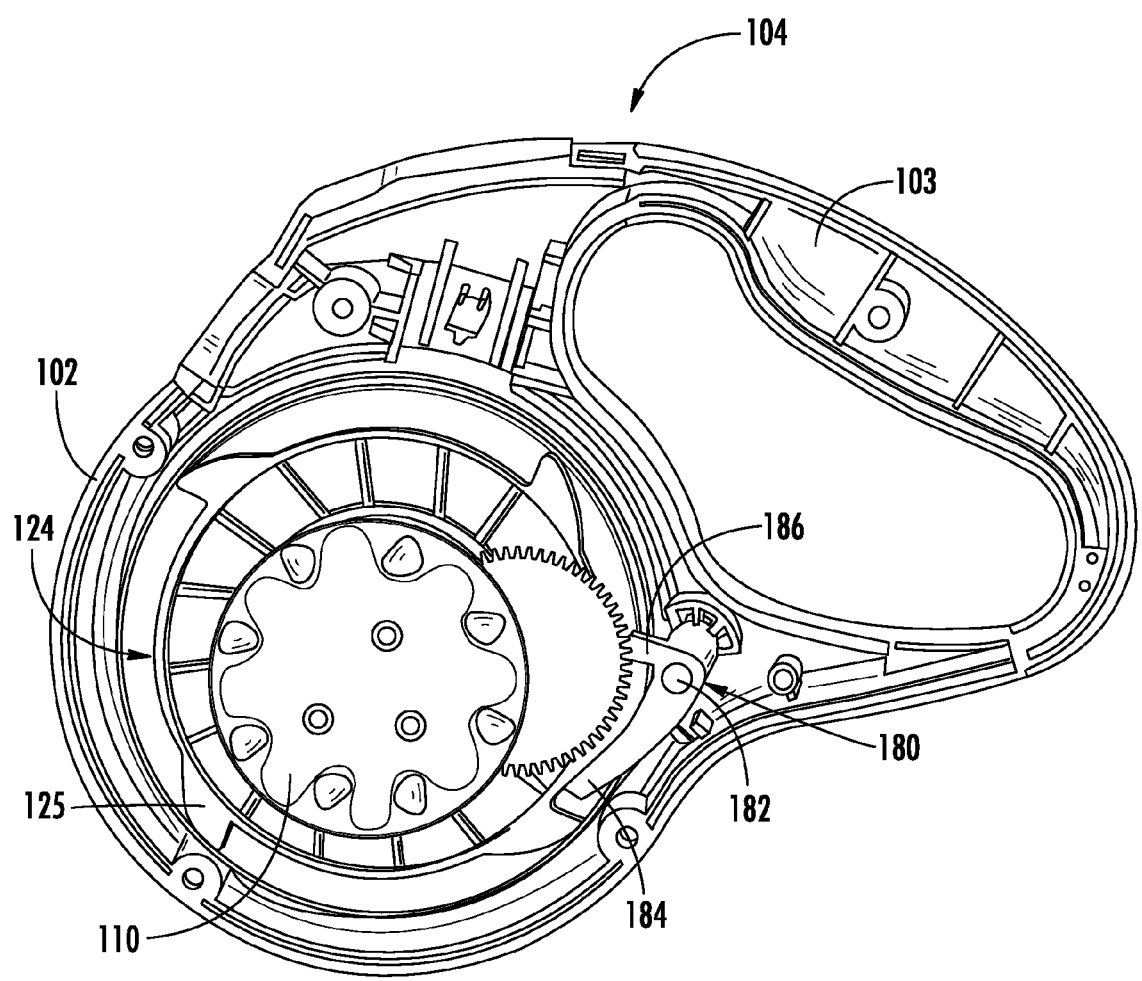
FIG. 25 is a left side elevation view of the retractable leash assembly as shown in FIG. 24.

Referring to FIGS. 18, 24 and 25, the control knob 110 is operatively connected to a clutch assembly including a driver 170, a sleeve 172 and a coil spring 174. The driver 170 is a cylindrical member positioned along the axis of rotation of the spool 124 between the carrier linkage 140 and the control knob 110. The sleeve 172 is a hollow cylindrical piece having a radial flange 173 extending outwardly from the outer end of the sleeve 172. The sleeve slips into the central axial opening in the left side half 106 of the housing 102 with the flange 173 against the surface of the housing 106 adjacent the opening. The sleeve 172 slips over the driver 170 for providing support for relative axial movement of the driver 170 and the control knob 110. The control knob 110 is secured with fasteners to the driver 170 through the sleeve 172 sandwiching the left half side 106 of the housing 102. The coil spring 174 fits over the shaft 132 of the spool 124 between the proximal end of the carrier linkage 140 and the plate member 130. The spring 174 biases the carrier linkage 140, driver 170 and control knob 110 outwardly such that the outer gear 148 of the gear train meshes with the ring gear 158. The driver 170 has a central axial bore for receiving an axis pin 176 (FIG. 18) extending through the shaft 132 of the spool 124 and into the spindle 108 for guiding the relative axial movement of the carrier linkage 140 and the clutch assembly.

With this arrangement, the distal end of the carrier linkage 140 is configured to be disposed at any position along the ring gear 158 adjacent the inner surface of the left side half 106 of the housing 102 by rotation of the control knob 110. As will described below, each position corresponds to a different maximum extended length of the leash as controlled by the user via the control knob 110.

Figure 27:
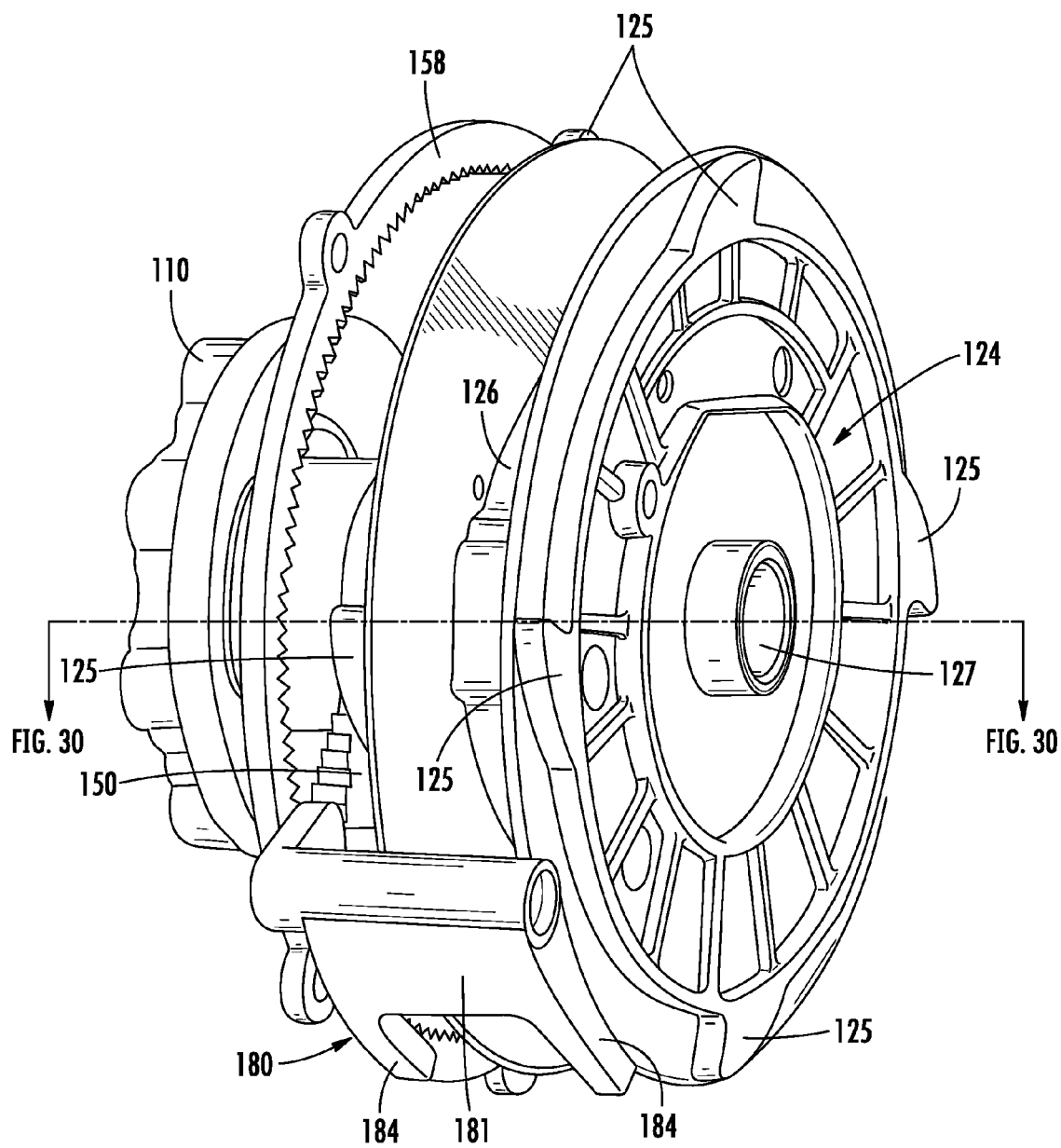
FIG. 27 is a right side perspective view of the retractable leash assembly as shown in FIG. 17 with the housing removed for clarity.
Figure 28:
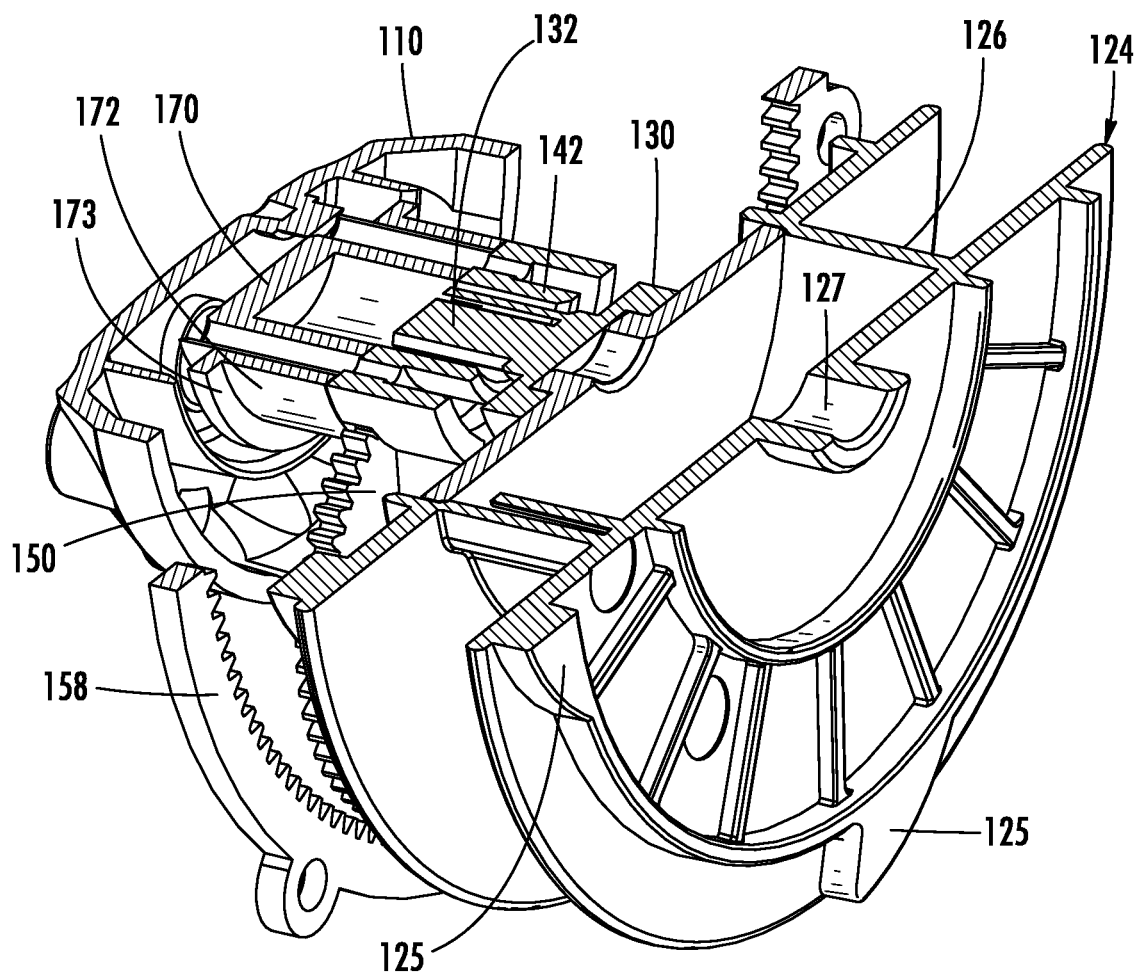
FIG. 28 is a cross-section of the retractable leash assembly taken along line 28-28 of FIG. 27.
Figure 29:
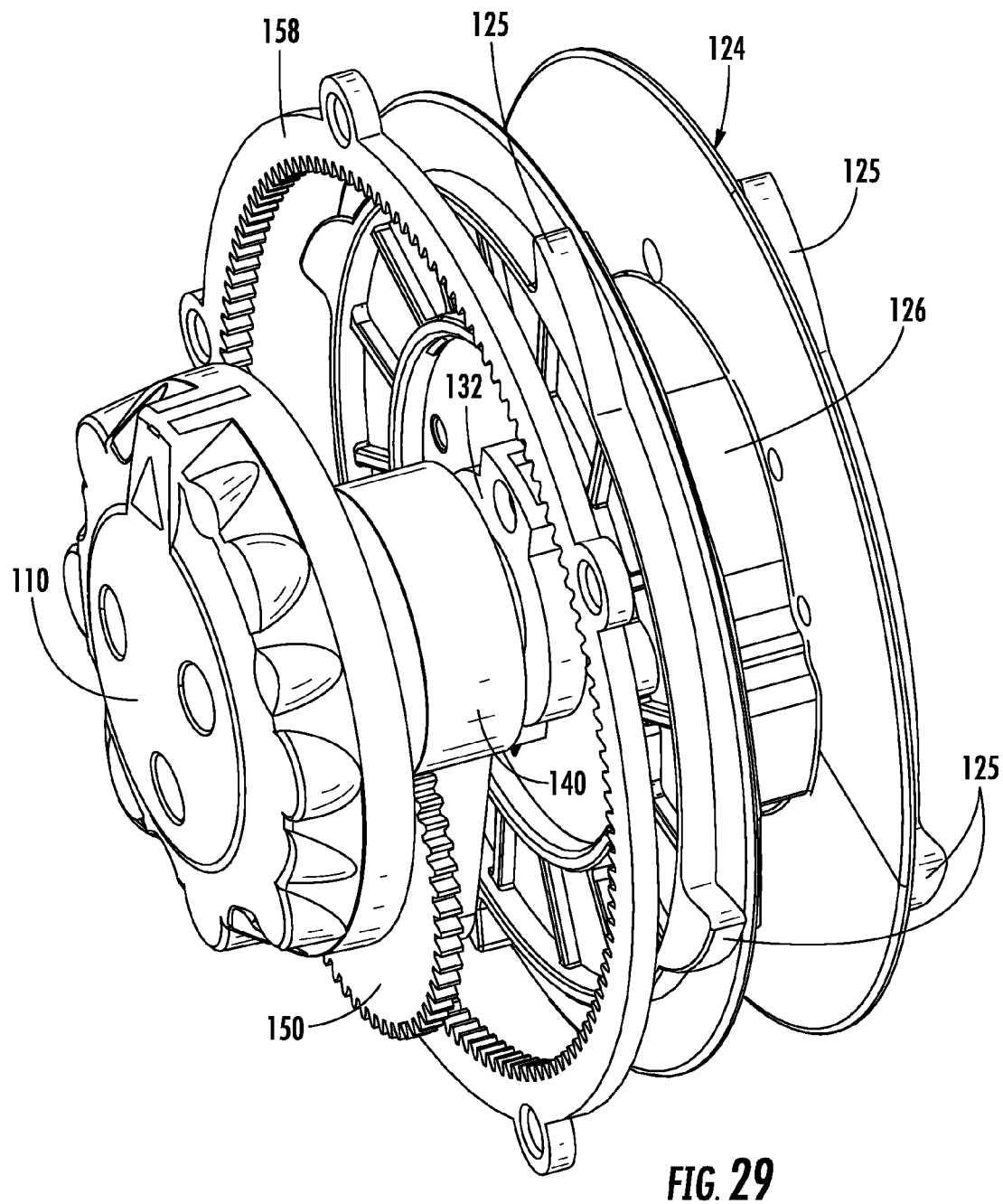
FIG. 29 is a left side perspective view of the retractable leash assembly as shown in FIG. 27.

A lockout pawl 180 is pivotably mounted via a pin 182 in the right half side 104 of the housing 102 for movement between a first position and a second position. The pin 182 extends inwardly from the right half side 104 of the housing 102 and into a transverse cylindrical bore 183 at the proximal end of the pawl 180. Referring to FIGS. 26A-26G, The lockout pawl 180 includes a central lever portion 181 extending forwardly from the axis of rotation of the pawl 180 and identical opposed stop arms 184 extending forwardly in parallel on each side of the lever portion 181. In this arrangement, each stop arm 184 is in the same plane as the toothed outside surfaces of the spool 124 (FIGS. 27-29). A spring 188 is mounted to the right half side 104 of the housing 102 and biases the pawl 180 in a clockwise direction when viewed from the right half side 104 of the housing 102 to the first position.

Figure 31:
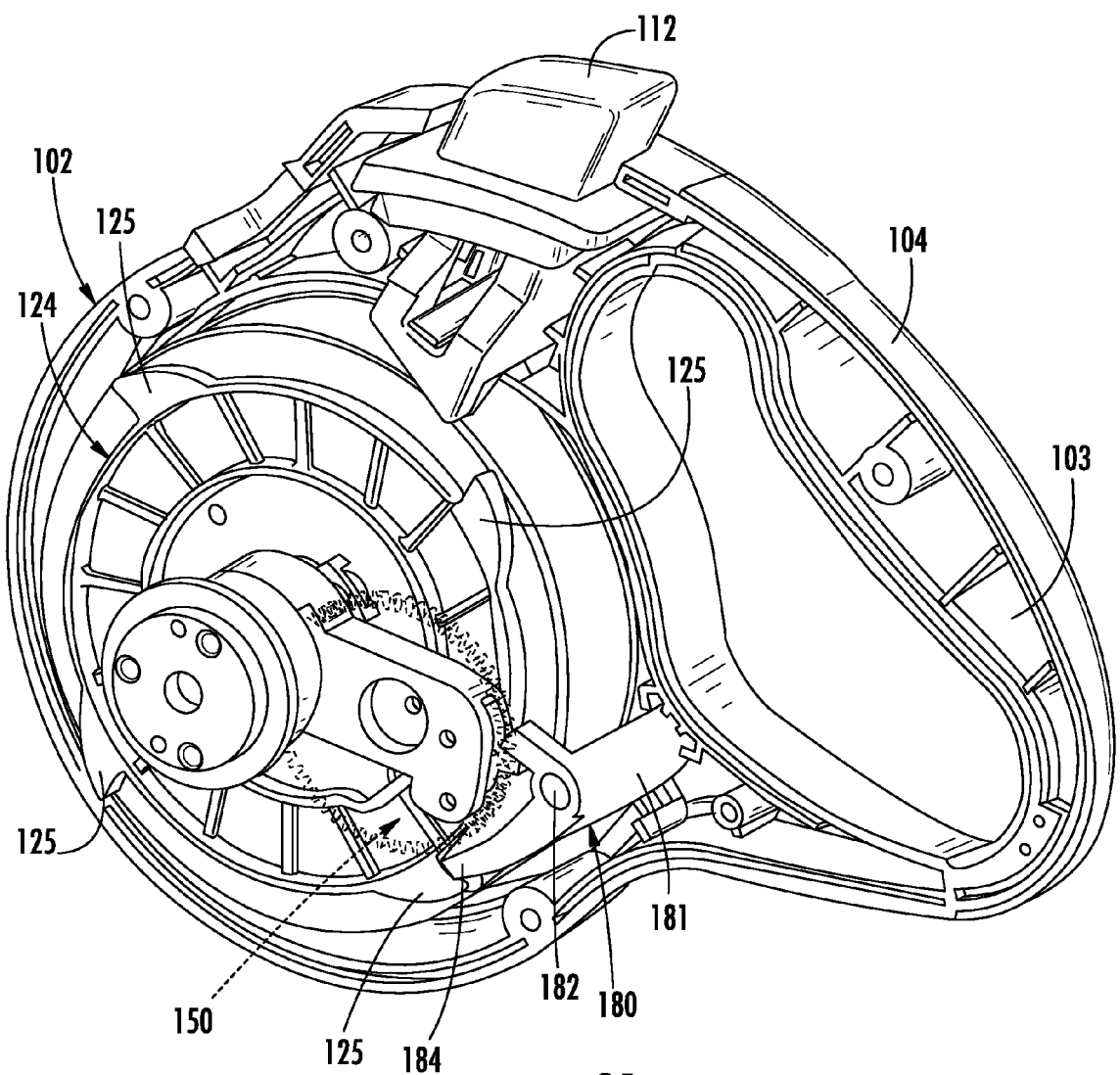
FIG. 31 is a left side elevation views of the retractable leash assembly as shown in FIG. 17 with the left side of the housing removed showing a distal end of the carrier linkage engaging the lockout pawl.
Figure 32:
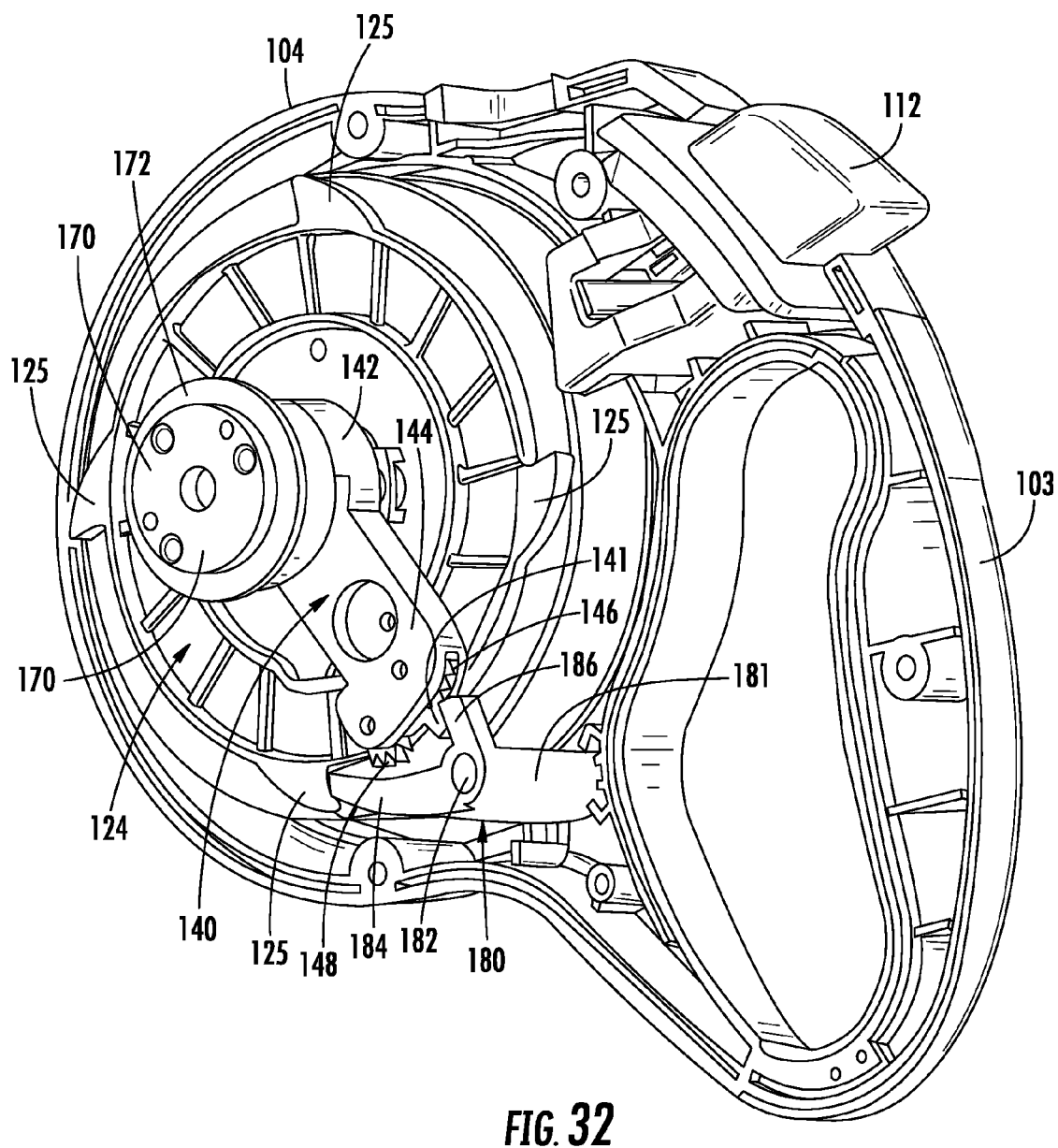
FIG. 32 are left side elevation views of the retractable leash assembly as shown in FIG. 31 with a portion of the gear train removed for clarity.

The carrier linkage 140 is configured to pivot the pawl 180 to the second position where the stop arms 184 engage the teeth 125 on the peripheral edges of the spool 124 for stopping the rotation of the spool 124 in the leash extension direction. This position is shown in FIGS. 31 and 32. Because the spool 124 is operatively connected through the gear train with the carrier linkage 140, the carrier linkage 140 rotates in a direction opposite of the spool 124, albeit at a slower speed, for driving the lockout pawl 180 to the second position.

Figure 30:
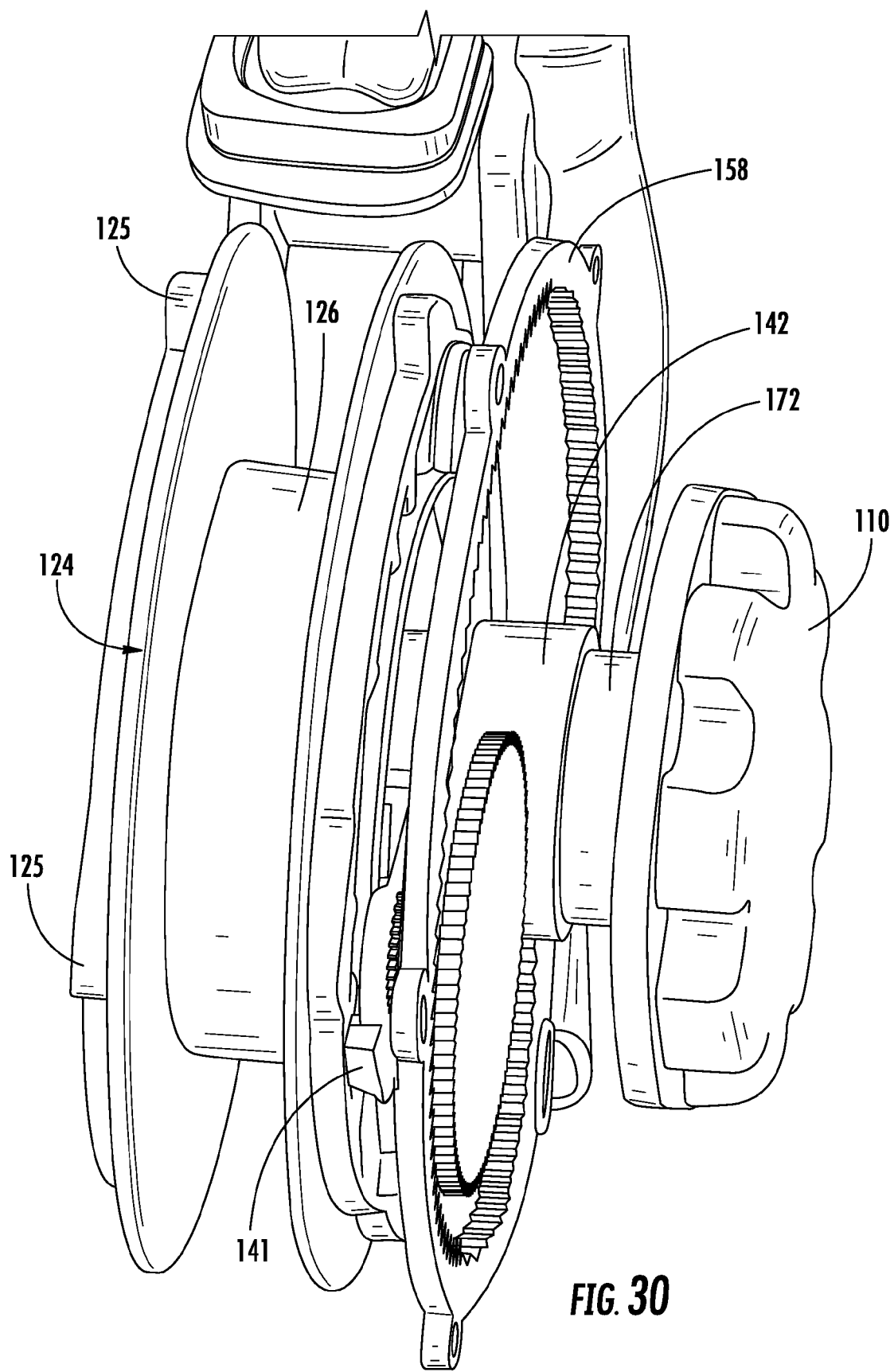
FIG. 30 is a top left side perspective view of the retractable leash assembly as shown in FIG. 29 with gear train in a second position.

In use, the user selects the maximum extended length of the leash by positioning the carrier linkage 140 relative to the lockout pawl 180 via the control knob 110. Each position of the carrier linkage 140 corresponds to a selected maximum length of the leash. To make this selection, the user pushes the control 110 knob inwardly along the central axis of the housing 102 against the force of the spring 174. Inward movement of the control knob 110 moves the connected driver 170 and the carrier linkage 140 axially inwardly of the housing 102. As a result, the outer gear 148 moves out of engagement with the ring gear 158 such that the carrier linkage 140 is free to turn with the knob 110 as shown in FIG. 30. When the user releases the knob 110, the spring 174 forces the carrier linkage 140 outwardly and back into engagement with the ring gear 158. The carrier linkage 140 must then rotate from the selected starting position to engage the lockout pawl 180. As the leash extends from the housing 102 and unwinds from the spool 124, the carrier linkage rotes with the spool 124 until the cam surface 141 on the distal end of the carrier linkage 140 engages an actuating lever 186 on the pawl 180. Continued rotation of the carrier linkage 140 in the counter-clockwise direction forces the pawl 180 to pivot in a clockwise direction to the second position such that the stop arms 184 are moved into engagement with unidirectional teeth 125 on the outer surfaces of the spool 124. This is shown in FIGS. 31 and 32 depicting the carrier linkage 140 engaging and moving the lockout pawl 180 to the second blocking position for stopping extension of the leash. In this position, the lockout pawl 180 locks the spool 124 from rotation in a leash extension direction. Thus, only a selected length of the leash is available since the pawl 180 engages the spool 124 once the maximum length is reached as predetermined by the relative positions of the carrier linkage 140 to the pawl 180. Note that when an extended leash length is less than a selected length, the lockout pawl 180 is not engaged by the carrier linkage 140 such that the retractable leash assembly 100 functions like a conventional retractable leash without a length restriction for the leash.

In both embodiments of the retractable leash assembly 20, 100, the leash 21 remains automatically retractable at all times. Specifically, when the animal moves closer, rotation of the spool 24, 124 in the retracting direction moves the carrier linkage 42, 140 and the cam surface 64, 141 away from the actuating lever 66, 186 on the pawl 28, 180. When the cam surface 64, 141 moves away from the actuation lever 66, 186, the torsion spring 59, 188 pivots the lockout pawl 28, 180 to the first position such that the stop arms 62, 184 are disengaged from the unidirectional ratchet teeth 61, 125 on the spool 24, 124 and the cogs 63 in the center support 34. Rotation of the spool 24, 124 in the retraction direction retracts the leash to eliminate slack.

It should be understood that the user can thus use the control knob 110 to adjust the position of the knob link 56 or the carrier linkage 140 to select any maximum length of leash longer than the length of extended leash as long as the cam surface 64, 141 of the carrier linkage 46, 140 is not already engaging the actuation lever 66, 186 of the lockout pawl 28, 180. For example, if the maximum extension length of the leash is set at seven feet and five feet of leash is currently extended from the housing 22, 102, the user can adjust the knob link 56 or the carrier linkage 140 from seven feet to any maximum leash length longer than five feet. The user cannot adjust the maximum leash length to a distance shorter than the current length of the extended leash. For example, the user could not adjust the knob link 56 or the carrier linkage 140 to a three feet maximum leash length setting because the lockout pawl 28, 180 would be engaged by the carrier linkage 46, 140 before reaching the shorter setting.

The retractable leash assembly has many advantages, including providing a mechanism that allows the user to quickly and easily adjust the maximum length of the leash appropriate for a current environment. The control knob on the side of the housing can set the maximum length at any length in uniform or variable intervals. When the leash is extended and reaches the selected maximum length, a stop mechanism is automatically engaged for stopping the leash from further extending. In addition, the leash will remain taut and automatically retract in the range from a retracted condition to the selected length. The retractable leash assembly thus functions to maintain the animal within a user-controlled predetermined comfortable and safe distance.

Although the retractable leash assembly has been shown and described in considerable detail with respect to only a few exemplary embodiments thereof, it should be understood by those skilled in the art that we do not intend to limit the retractable leash assembly to the embodiments since various modifications, omissions and additions may be made to the disclosed embodiments without materially departing from the novel teachings and advantages, particularly in light of the foregoing teachings. Accordingly, we intend to cover all such modifications, omission, additions and equivalents as may be included within the spirit and scope of the retractable leash assembly as shown and described herein.

We claim:

1. An apparatus for automatically retracting a leash for an animal, the leash retracting apparatus comprising:
   a housing defining an opening for passing the leash;
   a spool rotatably mounted in the housing for selectively winding and unwinding of the leash, the spool including a hub defining a rotation axis, and gear teeth disposed about an outer surface of the hub;
   a gear train including a plurality of gears, the gear train operatively engaged with the gear teeth on the hub of the spool for rotation of the gears in the gear train;
   a carrier linkage being rotatable about the rotation axis of the spool, the carrier linkage defining a cavity for housing a portion of the gear train for rotation of the carrier linkage about the rotation axis upon rotation of the gears in the gear train, a distal end of the carrier linkage including a radially outwardly extending cam surface;

a lockout pawl pivotably secured in the housing, the pawl movable between a first position that enables the spool to freely rotate and a second locked position to lock the spool against rotation, wherein the cam surface on the rotating carrier linkage is configured to engage the pawl for moving the pawl to the second position; and a control knob being rotatable about the rotation axis, the control knob enabling the gear train to be selectively positioned with respect to the pawl, wherein the control knob functions to selectively predetermine a maximum length of the leash extending from the housing before the cam surface on the carrier linkage engages the pawl as the leash is being unwound from the spool, causing the pawl to rotate to the second position into engagement with the spool for preventing rotation of the spool.

2. The leash retracting apparatus as recited in claim 1, wherein the gear train includes at least one drive gear and at least one compound gear for achieving a predetermined gear reduction.

3. The leash retracting apparatus as recited in claim 2, wherein the at least one compound gear is larger in diameter than the at least one drive gear.

4. The leash retracting apparatus as recited in claim 2, wherein the gear train obtains about a 30 to 1 gear reduction.

5. The leash retracting apparatus as recited in claim 1, further comprising a knob link disposed in the housing and having a proximal end and a distal end, the proximal end of the knob link operatively connected to the control knob for being rotatable about the rotation axis, and the distal end of the knob link pivotably connected to the lockout pawl, wherein the lockout pawl is selectively positioned with respect to the carrier linkage by rotation of the control knob.

6. The leash retracting apparatus as recited in claim 5, wherein an inner surface of the housing adjacent a periphery of the spool includes teeth engaged by the pawl in the second position of the pawl for preventing rotation of the spool.

7. The leash retracting apparatus as recited in claim 1, wherein the control knob is connected for rotation with the carrier linkage about the rotation axis, wherein the carrier linkage and the gear train are selectively positioned with respect to the pawl by rotation of the control knob.

8. The leash retracting apparatus as recited in claim 7, wherein the control knob and the carrier linkage are movable relative to the housing along the rotation axis for disconnecting the gear train and allowing rotation of the control knob and the carrier linkage relative to the pawl.

9. The leash retracting apparatus as recited in claim 1, further comprising teeth disposed about a periphery of the spool, wherein the pawl engages at least one of the teeth about the periphery of the spool for preventing rotation of the spool.

10. The leash retracting apparatus as recited in claim 1, wherein the spool is spring biased, enabling the spool to freely retract any slack in the leash.

\* \* \* \* \*